United States Patent [19]
Oda et al.

[11] Patent Number: 5,764,378
[45] Date of Patent: Jun. 9, 1998

[54] IMAGE FORMING APPARATUS

[75] Inventors: Yasuhiro Oda; Kazuhiko Arai; Kazuhiro Iwaoka; Takayuki Yamashita; Masayo Higashimura; Masahiko Kubo, all of Nakai-machi, Japan

[73] Assignee: Fuji Xerox Co., Ltd., Tokyo, Japan

[21] Appl. No.: 544,703

[22] Filed: Oct. 18, 1995

[30] Foreign Application Priority Data

Dec. 12, 1994  [JP]  Japan .................................. 6-331436

[51] Int. Cl.$^6$ .............................. H04N 1/21; B41B 15/00; G06F 15/00
[52] U.S. Cl. .......................... 358/448; 358/296; 358/443; 358/452; 358/453; 395/112; 395/114
[58] Field of Search ..................... 358/296, 298, 358/425, 442, 443, 444, 448, 452, 453, 455, 456, 471, 481, 475; 395/112, 114; 347/135

[56]  References Cited

U.S. PATENT DOCUMENTS

| | | | |
|---|---|---|---|
| 4,999,718 | 3/1991 | Arai . | |
| 5,140,349 | 8/1992 | Abe et al. | 346/160 |
| 5,194,879 | 3/1993 | Kotabe et al. | 358/298 |
| 5,272,544 | 12/1993 | Sakai et al. | 358/445 |
| 5,416,506 | 5/1995 | Arai et al. | 347/135 |
| 5,450,212 | 9/1995 | Asada | 358/445 |
| 5,477,257 | 12/1995 | Murata | 358/296 |
| 5,495,341 | 2/1996 | Kawana et al. | 358/298 |
| 5,519,500 | 5/1996 | Kumamoto | 358/296 |

FOREIGN PATENT DOCUMENTS

| | | |
|---|---|---|
| 0 216 462 A2 | 4/1987 | European Pat. Off. . |
| 0 717 552 A2 | 6/1996 | European Pat. Off. . |
| 34 17 118 A1 | 11/1984 | Germany . |
| 41 33 474 A1 | 5/1992 | Germany . |
| A-1-280965 | 11/1989 | Japan . |
| A-4-36776 | 2/1992 | Japan . |
| A-4-37882 | 2/1992 | Japan . |

*Primary Examiner*—Edward L. Coles, Sr.
*Assistant Examiner*—Mark Wallerson
*Attorney, Agent, or Firm*—Oliff & Berridge

[57]  ABSTRACT

The present invention provides an image forming apparatus including first image density signal converter having a first conversion property for converting a multi-valued image density input signal to an image density output signal at a timing synchronizing with an image density signal clock, second image density signal converter having a second conversion property different from the first conversion property for converting a part of the image density input signal corresponding to a low density portion to an image density output signal indicating a value within a range in which an image is not developed, selection signal generator for outputting a selection signal having a period longer than that of the image density signal clock to select the first or second image density signal converter in a predetermined order, a phase of the selection signal being shifted in turn per every one or more main scanning synchronizing signals, pattern signal generator means for generating a pattern signal having a period longer than that of the image density signal clock, controller for shifting the phase of the pattern signal generated by the pattern signal generator means per every one or more main scanning synchronizing signals to form a screen image having a predetermined screen angle, a pulse width modulator for outputting a pulse width modulation signal generated by modulating pulse width of the image density output signal output from the first and second image density signal converter utilizing the pattern signal. An image is formed in accordance with the pulse width modulation signal output from the pulse width modulator.

20 Claims, 23 Drawing Sheets

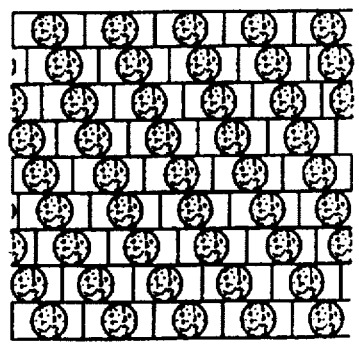
FIG.13a
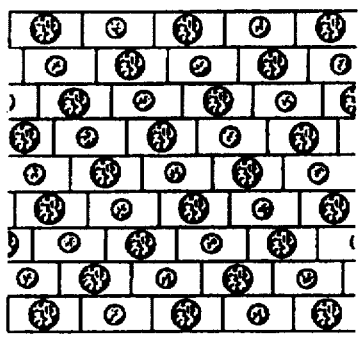 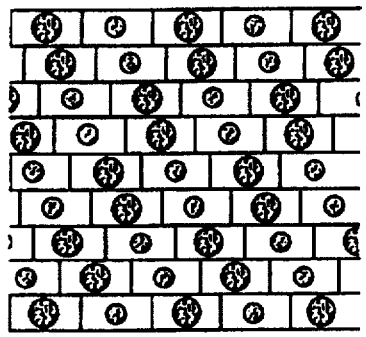 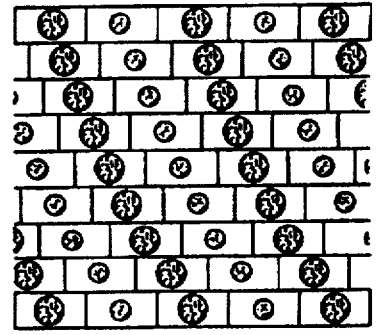
FIG.13b　　FIG.13c　　FIG.13d
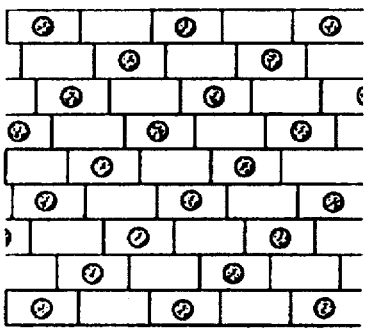 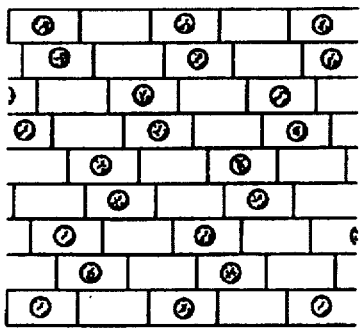 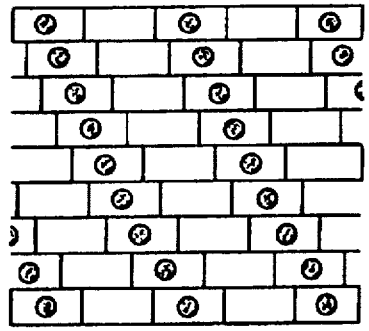
FIG.13e　　FIG.13f　　FIG.13g

| | | CONDITION OF EXPERIMENT | | | RESULT OF EXPERIMENT | |
|---|---|---|---|---|---|---|
| | COLOR | SCREEN ANGLE | LINE REDUCTION | | LOW DENSITY PORTION (Cin≤20%) REPRODUCIBILITY | LOW DENSITY PORTION (Cin≤20%) UNEVEN COLORING |
| FIRST EMBODIMENT | YELLOW | ±90° | YES | | ○ | ○ |
| | MAGENTA | +63.4° | YES | | | |
| | CYAN | −63.4° | YES | | | |
| COMPARATIVE EXAMPLE 2 | YELLOW | ±90° | YES | | ○ | × |
| | MAGENTA | ±90° | YES | | | |
| | CYAN | ±90° | YES | | | |
| COMPARATIVE EXAMPLE 3 | YELLOW | ±90° | NO | | × | ○ |
| | MAGENTA | ±63.4° | NO | | | |
| | CYAN | 63.4° | NO | | | |
| COMPARATIVE EXAMPLE 4 | YELLOW | ±90° | NO | | × | × |
| | MAGENTA | ±90° | NO | | | |
| | CYAN | ±90° | NO | | | |

FIG.21

IMAGE FORMING APPARATUS

BACKGROUND OF THE INVENTION

1. Field of the Invention

The present invention relates to an image forming apparatus employing the electrophotographic method which forms an image by scanning a light-sensitive medium with a light beam in accordance with a pulse width modulation signal of an image density signal to form an electrostatic image thereon, and developing the electrostatic image with toner.

2. Discussion of the Related Art

In a printer or a copying machine, a digital electrophotographic method is widely used as a method capable of providing high-speed image formation and a high quality image. In the method, exposure with pulse width modulation utilizing an analog screen generator, for example, is often carried out for reproduction of gradation of an image by scanning a light-sensitive medium with a light beam (See Japanese Patent Application Unexamined Publication No. Hei. 1-280965 (1989)).

In this case, the spot diameter of the light beam and the number of lines of the light beam are maintained constant in forming the image regardless of variation of density. Therefore, contrast of an exposure profile in the low density portion is reduced, thus being analog-like, and besides, reproduction capability of dots or lines and reproduction stability of gradation or tones depending on environments deteriorate because of a little exposure amount.

To overcome the above-problems, a method for stabilizing each factor, such that the amount of light beam, density of toner in a developer housing or the like, and a method called a process control which improves the reproduction stability of gradation or tones depending on environments by measuring the temperature, humidity, or density of toner in the developer housing and controlling a development bias potential or a value of the current for transfer, are suggested (See Japanese Patent Application Unexamined Publications Nos. Hei. 4-37882 (1992) and Hei. 4-36776 (1992)). However, these methods need a sensor of high precision or a control mechanism, thus having a problem of being complex and expensive.

In the meantime, image formation with a small number of lines for improving the contrast of the exposure profile in the low density portion can improve the reproduction capability of dots or lines in the low density portion. However, as for character image in a halftone image, for example, an image construction is apt to be easily recognized as the number of lines is reduced, which results in deterioration of image quality.

It is also possible to make the spot diameter of the light beam small enough to improve the contrast of the exposure profile in the low density portion while the number of lines is maintained so that the character image can be reproduced with the sufficient image quality, but an image-formation optical system which converges light beam and forms light beam spots on the light-sensitive medium is extremely precise and expensive, and accordingly it is unpractical.

Other methods have also been proposed to increase reproduction capability for dots or lines by varying the spot diameter or luminous intensity of the light beam to restrain deterioration of the contrast of exposure profile. However, these methods require a control mechanism which changes the spot diameter or luminous intensity of the light beam; therefore, these are also complex and expensive.

SUMMARY OF THE INVENTION

The present invention has been made in view of the above circumstances and has as an object of provision of an image formation apparatus which resolves the problems and removes the defects in the above-described conventional arts.

Another object of the present invention is to provide an image formation apparatus in which reproduction capability of dots or lines in a low density portion and stability in reproduction of gradation and tones depending on environments are improved, and moreover, change of hue etc. caused by, for example, pixel registration error is hard to be recognized.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an image forming apparatus of the present invention comprises first image density signal conversion means having a first conversion property for converting a multi-valued image density input signal to an image density output signal at a timing synchronizing with an image density signal clock, second image density signal conversion means having a second conversion property different from the first conversion property for converting a part of the image density input signal corresponding to a low density portion to an image density output signal indicating a value within a range in which an image is not developed, selection signal generation means for outputting a selection signal having a period longer than that of the image density signal clock to select the first or second image density signal conversion means in a predetermined order, a phase of the selection signal being shifted in turn per every one or more main scanning synchronizing signals, pattern signal generation means for generating a pattern signal having a period longer than that of the image density signal clock, phase control means for shifting the phase of the pattern signal generated by the pattern signal generation means per every one or more main scanning synchronizing signals to form a screen image having a predetermined screen angle, pulse width modulation means for outputting a pulse width modulation signal generated by modulating pulse width of the image density output signal output from the first and second image density signal conversion means utilizing the pattern signal, and image formation means for forming an image in accordance with the pulse width modulation signal output from the pulse width modulation means.

The image formation apparatus roughly comprises conversion means for converting an image density signal, conversion selecting means for selecting a conversion property of the conversion means, pulse width modulation means for modulating the pulse width of the image density signal and image formation means for forming an image in accordance with the pulse width modulation signal.

The conversion means has at least two image density signal conversion means with different properties (shown in figures as 405 and 406 in FIG. 1, 1505 and 1506 in FIG. 15, and 1705 and 1706 in FIG. 17) which convert the multi-valued image density signal at the timing synchronizing with the image density signal clock, and at least one image density signal conversion means has a property for converting a part of the input image density signal corresponding to the low density portion into 0 or the image density signal corresponding to the range in which the electrostatic latent image is not developed.

The conversion selecting means comprises selection signal generating means (shown in figures as 404a–404d in FIG. 5 and 404g–404o in FIG. 6) for outputting the selection signal for selecting the image density conversion means having a period longer than that of the image density signal clock described above with phase variation per every one or more start of scanning (SOS) signals and selection means (404p–404q in FIG. 6) for periodically selecting at least image density conversion means in accordance with the selection signal output by the selection signal generating means.

The pulse width modulation means comprises pattern signal generation means (401 in FIG. 1, 1501 in FIG. 15 and 1701 in FIG. 17) for generating a pattern signal having a period longer than that of the image density signal clock, phase control means (409–411 in FIG. 1, 1509–1511 in FIG. 15 and 1709–1711 in FIG. 17) for successively varying the phase of a signal generated by the pattern signal generation means per every one or more horizontal scanning synchronizing signals to form a screen image having a predetermined screen angle and modulation means (402 in FIG. 1, 1502 in FIG. 15 and 1702 in FIG. 17) for carrying out pulse modulation on the image density signal output by the conversion means by utilizing the pattern signal.

The image formation means (1–9 and 20 in FIG. 3) forms an image in accordance with the pulse width modulation signal output by the pulse width modulation means.

One of the modes of the selection signal generation means comprises a first counter (404a in FIG. 5) for counting the horizontal scanning synchronization signal, storing means (404b) for storing an initial counted value to determine the phase of the selection signal and selecting and outputting the stored value in accordance with a value output by the first counter, and a second counter (404c), in which initialization is made based on the initial counted value output by the storing means, for generating the selection signal by dividing the image density signal clock.

Another mode of the selection signal generation means comprises a first counter (404g in FIG. 6) for counting the horizontal scanning synchronization signal, storing means (404h) for storing a value representing plural phases and selecting and outputting a stored value based on the value output by the first counter, signal generation means (404i) for generating plural signals of different phases by dividing the image density signal clock, and means (404j–404n) for selecting one of the plural signals of different phases output by the signal generation means based on the output by the storing means and outputting the selected signal as the selection signal.

Further to the above-described image formation apparatus of the prior art, the present invention is characterized in that the following inequality 1 is satisfied:

$$k/L \leq 1/2 \qquad \text{(formula 1)}$$

wherein L is the number of gradation of the image density signal in at least two image density signal conversion means and k is the largest conversion value of the image density signal in portions having different properties.

Here, in the case where the image density signal is composed of digital data of x bits, the number of gradation L is represented as $L=2^x$.

Another aspect of the present invention, further to the above-described image formation apparatus of the prior art, is characterized in that the image formation means comprises light beam scanning means for performing relative scanning on the light-sensitive medium with light beam and an image-formation optical system for converging the light beam and forming a light beam spots of a predetermined size on the light-sensitive medium. Supposing a distance between pixels adjoining each other in the direction of main scanning in forming a part of an image of low density portion is $d_p$ (mm) and the spot diameter ($1/e^2$) of the light beam in the direction of main scanning on the light-sensitive medium is $d_B$ (mm), the following inequality 2 is satisfied:

$$d_B \leq (1/3)d_P. \qquad \text{(formula 2)}$$

A further aspect of the present invention can also comprises conversion/non-conversion discrimination means (1712 in FIG. 17) for discriminating whether image signal line-reduction conversion on each group of image density signals is carried out or not, selection means (1716) for determining whether the group of image density signals is converted by the image signal conversion means and then output, or output without conversion, and operation means (1704) for obtaining a single image density signal by executing predetermined operation on plural image density signals in each group and outputting the obtained image density signal to the plural image density conversion means.

The light beam scanning means scans the light-sensitive medium relatively with the light beam. The image-formation optical system forms a light beam spot of a predetermined size on the light-sensitive medium. The pulse width modulation means determines the time for on-off control of the light beam in accordance with the image density signal, whereby electrostatic image is formed on the light-sensitive medium according to the image density signal. Later the electrostatic image will be developed with powder toner or liquid toner, thus forming an image.

FIGS. 2(a) through 2(c) show exposing energy profiles on the light-sensitive medium when exposure of the light-sensitive medium using the light beam scanning means, the image-formation optical system and the pulse width modulation means. Here, ratio of the distance between pixels adjoining in the direction of main scanning $d_P$ (mm) to the spot diameter of the light beam $d_B$ (mm) is represented as D, and FIGS. 2(a), 2(b) and 2(c) show the results of exposure when the spot diameter of the light beam $d_B$ (mm) is maintained constant and D is 1/1, 1/2 and 1/3, respectively. If the number of lines (line per inch) is indicated by N, the following equality is satisfied:

$$d_P = 25.4/N \quad D = d_B/d_P \qquad \text{(formula 3)}$$

In the electrophotographic process, the development bias potential is provided in process of development to prevent attachment of toner to the non-image portion. In FIGS. 2(a) through 2(c), a line corresponding to the development bias potential is given for indicating reverse development by which an exposed portion is developed.

As it is remarkable in FIG. 2(a), with the reduction of the pulse width (%), the contrast of the exposure energy profile is also reduced, thus being analog-like. The amount of exposure energy exceeding the line corresponding to the development bias potential in the profile is decreased and it becomes impossible to reproduce dots or lines.

As shown in FIGS. 2(a) through 2(c), if the smaller the value of D is, and reduced to be 1/1, 1/2, 1/3, the more the deterioration of the contrast can be restrained. Therefore, when the spot diameter of the light beam $d_B$ is maintained constant, preferable reproduction of dots or lines in the low density portion is possible and stability in reproduction of gradation and tones depending on environments increases by reducing the number of lines N to reduce the value of D.

It has been conventionally known that reproduction of the low density portion is important in designing the image quality, and accordingly, it is necessary to reproduce at least 10% pulse width.

FIGS. 2(a) through 2(c) indicate that no dots or lines are reproduced when pulse width is 10% and the value of D is 1/1, but they are stably reproduced when the pulse width is 10% and the value of D is 1/3. Consequently, by setting the value of D to be 1/3 or less, that is, $$d_B \leq (1/3) d_P,$$

stable image reproduction in the low density portion can be realized.

In the present invention, the number of lines in the low density portion is practically reduced by converting the image density signal. That is, at least two image density signal conversion means have conversion properties different from each other, and at least one of the conversion means has property to convert a part of the input image density signal corresponding to the low density portion into 0 or the image density signal representing a part not to be developed. An example is shown in FIGS. 7(a) and 7(b). One of the conversion means has the property that the output for the image density signal of the low density portion is 0, as shown in FIG. 7(b); therefore, if the image density signal indicates low density, there is no output. As shown in FIGS. 11 and 12, these conversion means operate at the timing synchronizing with the image density signal clock and are selected by the selection signal having a period longer than that of the image density signal clock. Accordingly, even if the phase control means for changing the phase of the pattern signal having a predetermined period, namely, the timing of generating the pattern signal to form an image having a predetermined screen angle, these conversion means can operate at the timing synchronizing with the image density signal clock conforming to change of the phase, as shown in FIGS. 8, 9 and 10, and it is possible to change the order of operation of at least two image density signal conversion means at every light exposure scanning. Because, as previously described, the image density signal conversion means operates at the timing synchronizing with the image density signal clock, the conversion means is selected by the selection signal having a period longer than that of the image density signal clock, and the pulse width modulation is carried out with the pattern signal having a period longer than that of the image density signal clock, m pixels are formed from n image density signals by using the pattern signal of the predetermined period (m<n).

That is, in the case where the image density signal conversion means having properties shown in FIGS. 7(a) and 7(b) are operated at the timing synchronizing with the image density signal clock having a predetermined period, for example, as shown in FIG. 11, in the case the phase of the pattern signal is shifted by 1/4 phase per every sub scanning process with the period of 4 sub scanning processes, the conversion means are operated in the order of A, A, B, B, A, A, B, B, ..., in the direction of main scanning, and in the next exposure scanning, operated in the order of B, B, A, A, B, B, A, A, ..., that is, order of operation in turn is changed, and moreover, in the next exposure scanning, the order of operation is B, A, A, B, B, A, A, B, ..., in the main scanning direction, where the order of operation is periodically changed. This means that order of operation of the image density signal conversion means which operate time-divisionally at the timing synchronizing with the image density signal clock is changed in the direction of sub scanning per every one or more scanning lines. According to this operation, input image density signals corresponding to the low density portion are partially removed, and in the output of the pulse width modulation, the number of lines is reduced in the low density portion and increased in the middle-high density portion without occurrence of phase shifting error. In FIG. 11, the portion where the electrostatic image is formed when the uniform low density signal is input is indicated by a dot pattern.

However, in the case where the image density signal conversion means having a property such that the largest converted value of the image density signal in an area having different properties exceeds 50% of the number of gradations of the image density signal is selected to be used from the group of at least two image density signal conversion means, an image density signal converted to be 50% or more of the number of gradations is compared with a pattern signal having a predetermined period to modulate the pulse width, desirable electrostatic image formation corresponding to increase of the image density signal is impossible in 4th image density signal, 8th image density signal and 12th image density signal in the second line of FIG. 11, or 1st image density signal, 5th image density signal and 9th image density signal in the fourth line or the like, though the converted value exceeds 50% of the number of gradations. For this reason, the largest converted value of the image density signal must be smaller than 50% of the number of gradations of the image density signal.

The pulse width modulation means has a function for performing pulse width modulation in accordance with an analog density signal and the pattern signal having a predetermined period. Two or more pattern signals having different periods may be prepared and one of them can be selected as necessary.

Furthermore, in the present invention, it is possible to carry out good reproduction of a line image or an edge portion of an image in the case whether conversion by the conversion means is performed or not can be constructionally selected.

As described above, in the image formation apparatus having means for changing the timing of generating the pattern signal of a predetermined period to form an image having a predetermined screen angle, stability in reproduction of gradation or tones depending on environments and reproducibility of dots or lines in the low density portion can be improved, and moreover, it is hard to recognize uneven coloring or change of hue caused by the pixel registration error, whereby the image quality can be made higher.

In the above description, the property of the image density signal conversion means is explained on condition that the output of one of the conversion means corresponding to the low density portion is 0 for simplification.

Generally, in an electrophotographic apparatus including a light beam scanning process, values corresponding to a range which is not developed exist though the output of the conversion means is not 0, because the laser diode does not respond to a minute input signal or the development bias potential is applied for restraining attachment of toner to non-image portion of the recording sheet.

That is, in the property of the image density signal conversion means, it is not an absolute condition that the output of one of the conversion means corresponding to the low density portion is 0. For example, as FIGS. 20(a) and 20(b) show, the output of the conversion means corresponding to the low density portion may be converted into values within a range which is not developed.

The purpose of the present invention is to reduce the number of lines by the property that the output of one of the conversion means corresponding to the low density portion is a value within a range which is not developed.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 13 shows pixel arrangements in the image formation apparatus according to the present invention;

FIG. 21 show results of evaluation about image quality;

DETAILED DESCRIPTION OF THE PREFERRED Embodiment

Preferred embodiment of an image formation apparatus according to the present invention is now described in detail based on the drawings.

First Embodiment

Figure 3:
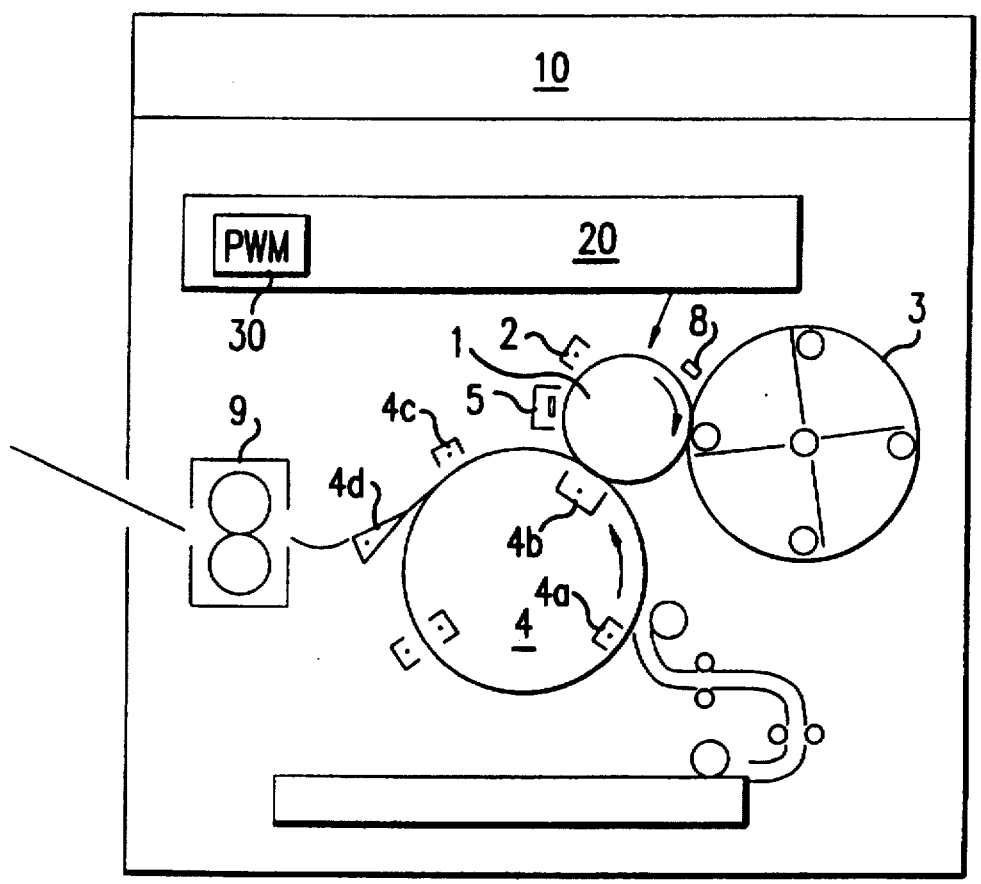
FIG. 3 shows the schematic construction of the first embodiment of the image formation apparatus according to the present invention.

FIG. 3 shows the construction of a first embodiment of an image formation apparatus according to the present invention.

Around a light-sensitive member 1 rotating in the direction indicated by an arrow, are disposed an electrostatic latent image formation charger 2, a rotation developing device 3, a transfer drum 4 and a cleaner 5.

The light-sensitive member 1 is uniformly charged by the charger 2 in a dark portion of the apparatus.

A light beam scanning device 20 scans the light-sensitive member 1 with the light beam. On-off control on the light beam is performed by a light beam pulse width modulation device 30 in accordance with a density signal output by a document reading component 10. Thereby exposure of the light-sensitive member 1 is carried out and an electrostatic image is formed. The spot diameter ($1/e^2$) of the light beam in the direction of main scanning on the light-sensitive member 1 is set to be 75 μm.

The rotation developing device 3 comprises 4 subordinate developing devices having toner of yellow, cyan, magenta and black, respectively. Each subordinate developing device adopts a reverse developing method using two-component magnetic brush development. Average diameter of toner used here is 7 μm. The rotation developing device 3 rotates appropriately and the electrostatic latent image is developed with toner of desired color. At that time the development bias voltage is applied to the developing roller to prevent attachment of toner to the blank portion. The transfer drum 4 attaches the recording sheet on its peripheral surface and rotates. The toner image on the light-sensitive member which has been developed is transferred to the recording sheet by a transfer device 4b.

The electrostatic latent image formation, development and transfer are carried out for each of colors, yellow, cyan, magenta and black. The toner transferred to the recording sheet by the above process is fixed by a fixing device 9, thus forming a multi-color image.

Figure 4:
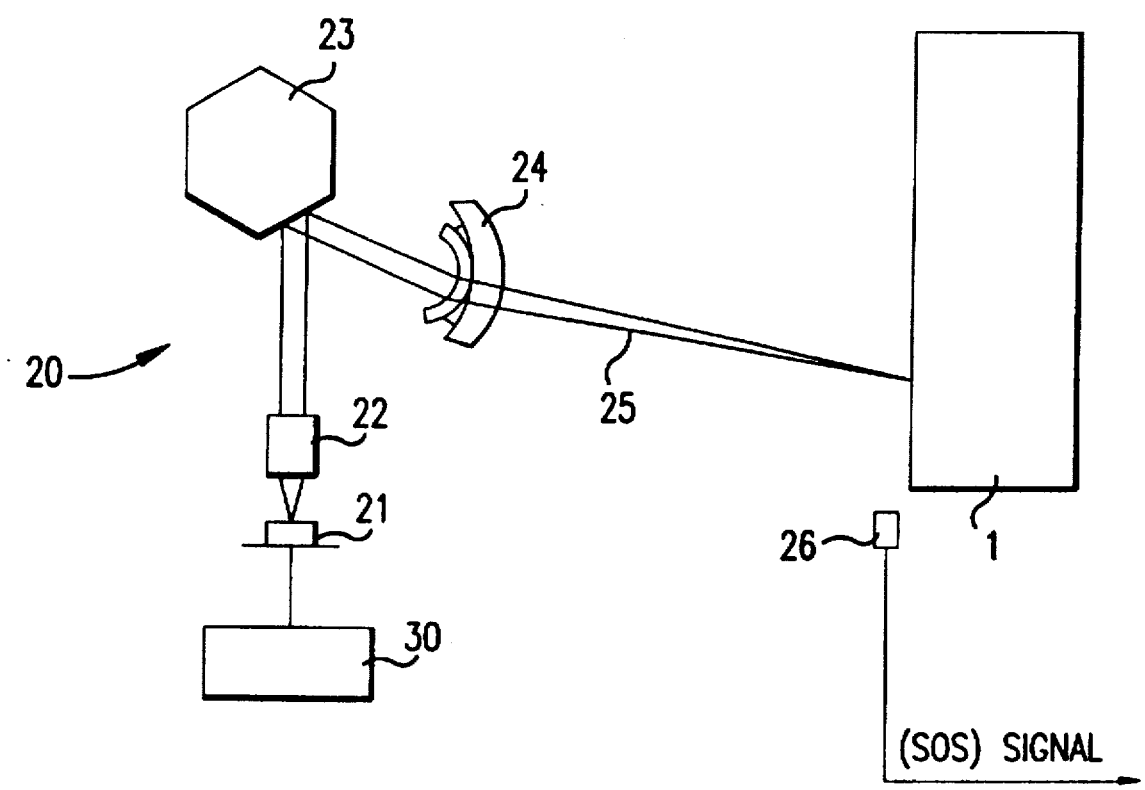
FIG. 4 shows the construction of a light beam scanning device of the first embodiment of the image formation apparatus according to the present invention.

FIG. 4 is a detailed illustration of the light beam scanning device 20 comprising a semiconductor laser 21, a collimator lens 22, a polygonal mirror 23, an f θ lens 24 and a scanning start signal generation sensor 26 for generating a start of scanning (SOS) signal to detect the timing of start of light beam scanning.

Figure 1:
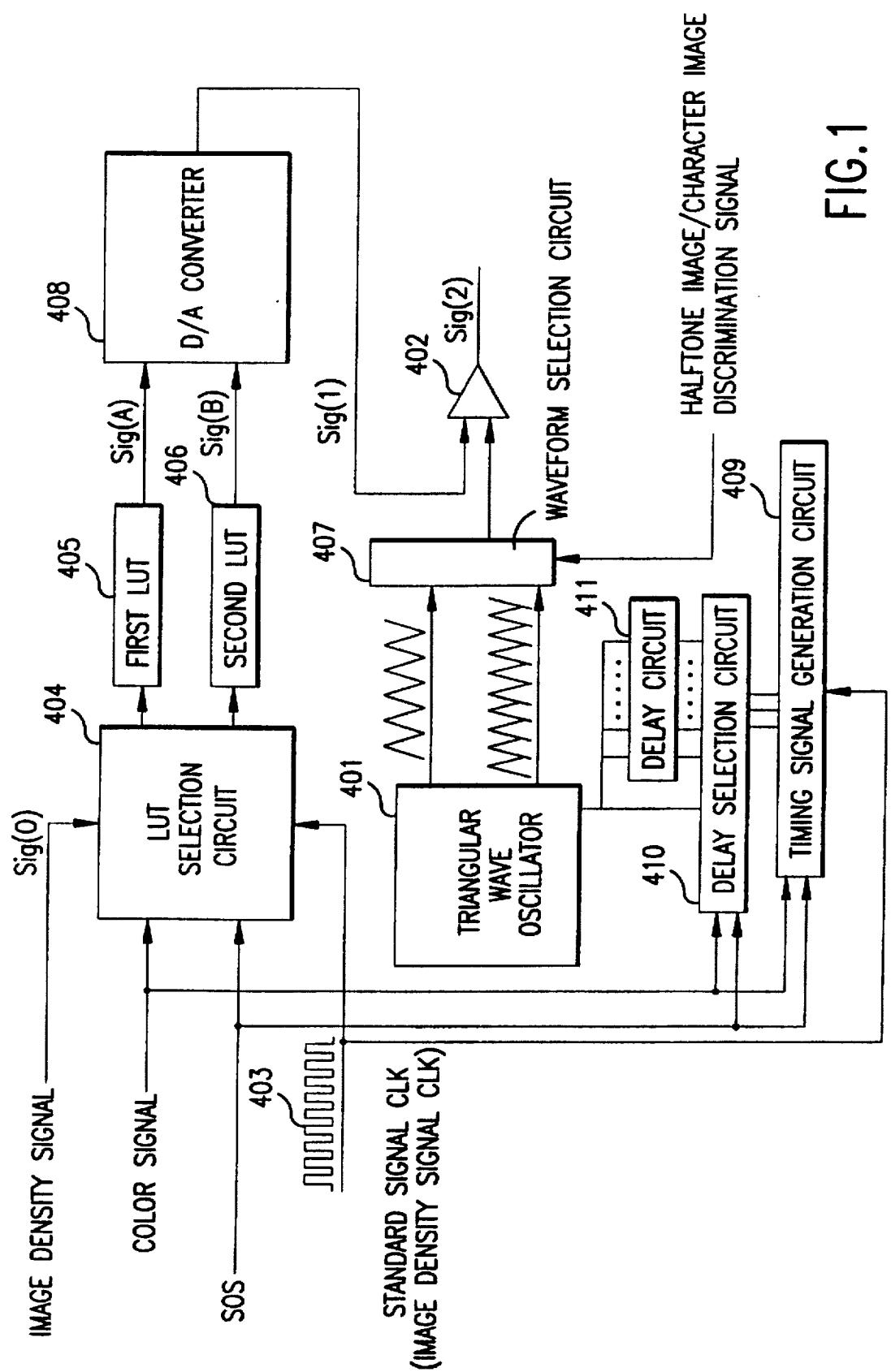
FIG. 1 shows the construction of pulse width modulation means of a first embodiment of an image formation apparatus according to the present invention.
Figure 2A:
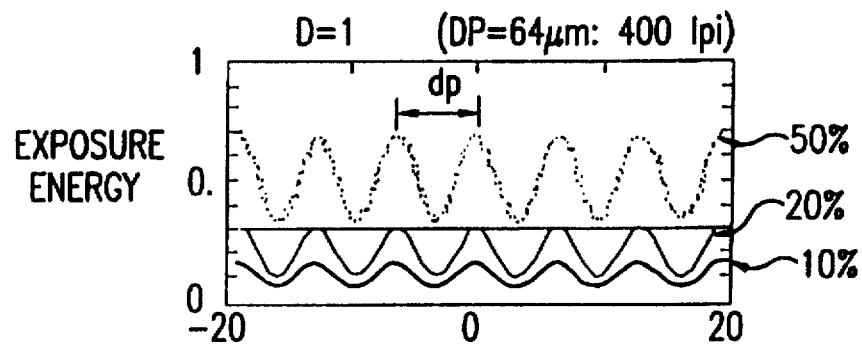
FIGS. 2(a) through 2(c) are view explaining operation of the image formation apparatus according to the present invention.
Figure 2B:
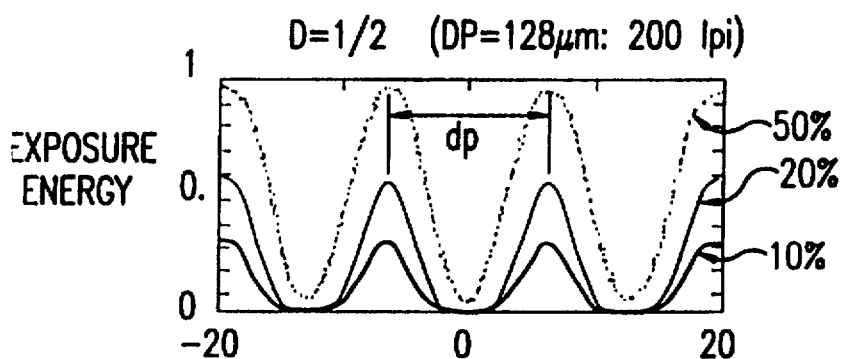
Figure 2C:
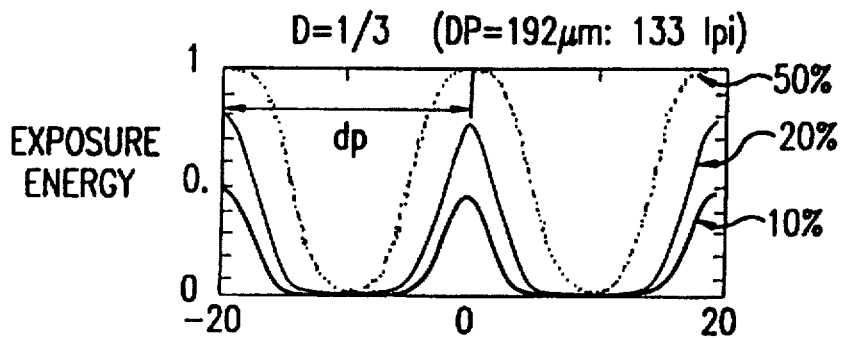

As shown in FIG. 1, the light beam pulse width modulation device 30 is composed of a triangular wave oscillator 401, a timing signal generation circuit 409, a delay selection circuit 410, a delay circuit 411, a waveform selection circuit 407, a comparison circuit 402, a first lookup table (LUT A) 405, a second lookup table (LUT B) 406, a D/A converter 408 and a LUT selection circuit 404.

The LUT selection circuit 404 comprises a counter, a flip-flop circuit or the like, which counts a standard clock signal (an image density signal clock), a color signal and the SOS signal, and periodically and distributionally outputs a digital image density signal supplied by the document reading component 10, for example, to the first lookup table (LUT A) 405 and the second lookup table (LUT B) 406.

Figure 5:
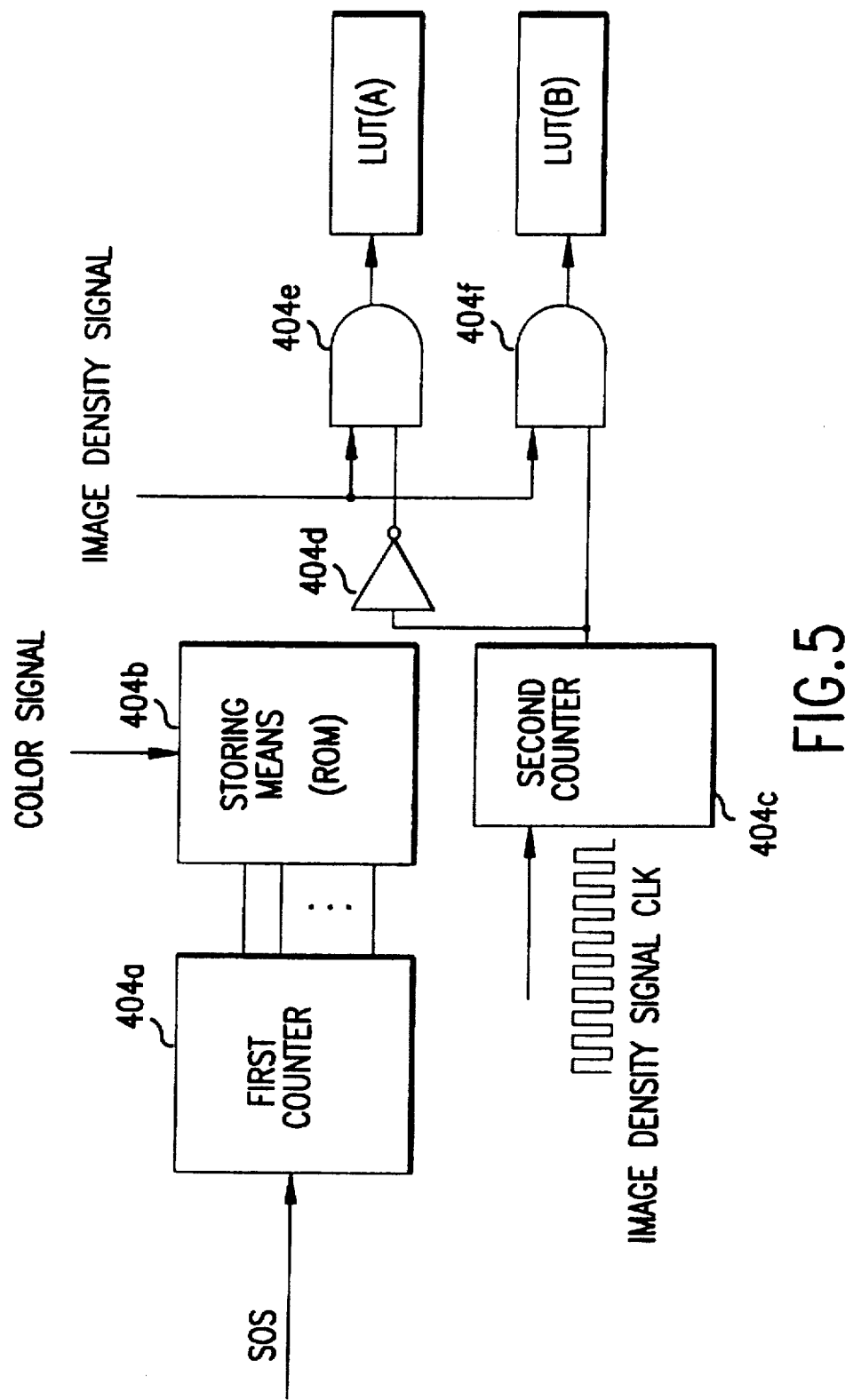
FIG. 5 shows a construction example of an LUT selecting circuit.

FIG. 5 shows an example of the circuit construction of the LUT selection circuit 404 which comprises a counter 404a counting the start of scanning (SOS) signal, a selector 404b which is a ROM storing a initial counted value for determining a phase of an image density conversion means selection signal and selecting and outputting the stored value in accordance with the output value of the first counter, and a counter 404c whose initial value is set in accordance with the output of the selector 404b. With this construction, the image density signal clock (the standard clock) is divided per generation of every SOS signal while the phase is shifted. By a NOT circuit 404d, AND circuits 404e and 404f, the image density signal is synchronized with the image density signal clock and periodically and distributionally output to the first lookup table (LUT A) 405 and the second lookup table (LUT B) 406.

Figure 6:
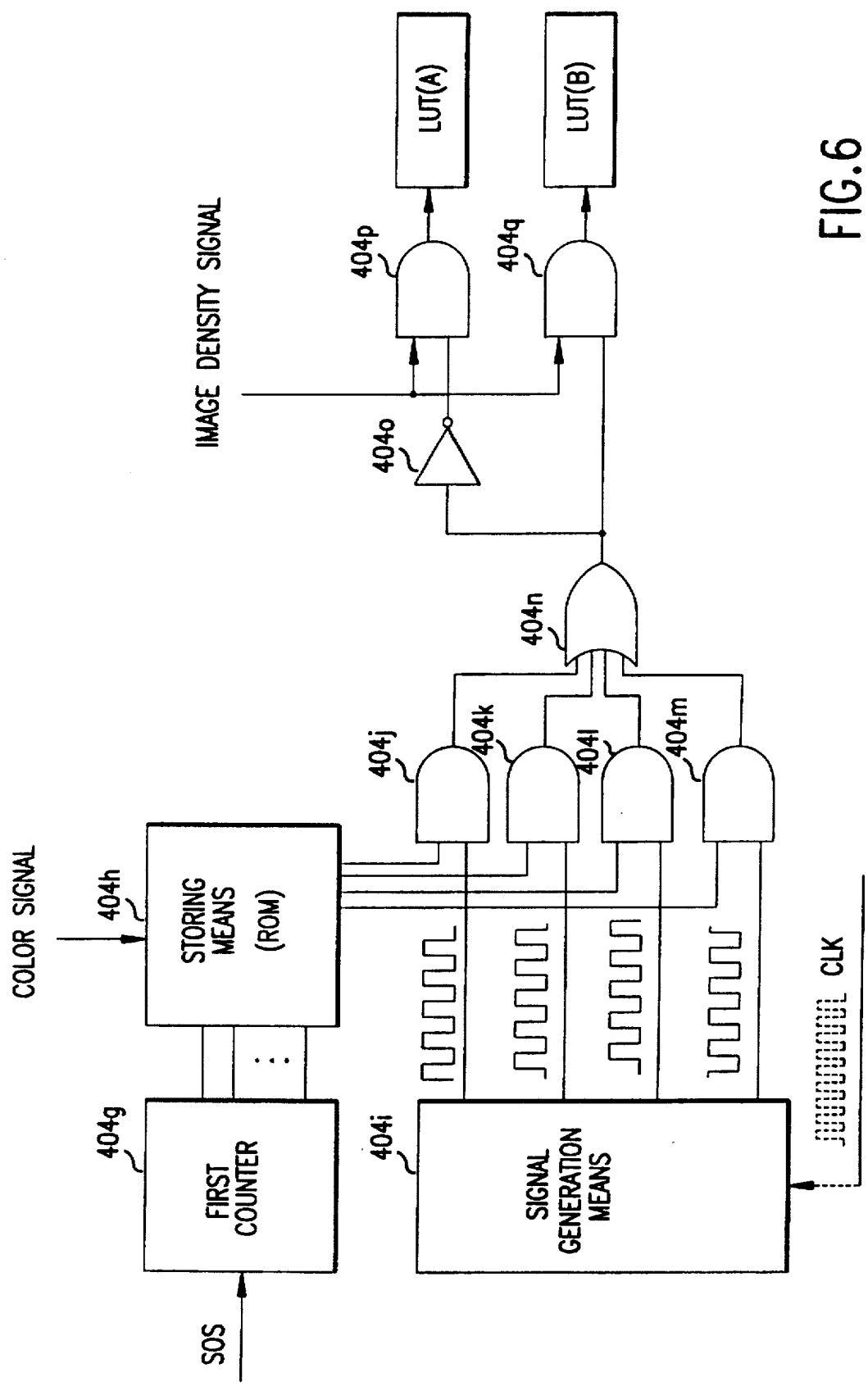
FIG. 6 shows another construction example of the LUT selecting circuit.

FIG. 6 shows another example of the circuit construction of the LUT selection circuit 404, which comprises a counter 404g counting the SOS signal, a selector 404h which is a ROM, a clock division delay circuit 404i, AND circuits 404j, 404k, 404l, 404m and an OR circuit 404n. With this construction, the image density signal clock is divided by the clock division delay circuit 404i for generating the clock having different phases which is selected by AND circuits 404j, 404k, 404l and 404m in accordance with the output of the selector 404h per every generation of SOS signal. The NOT circuit 404o and the AND circuits 404p and 404q synchronizes the image density signal with the image density clock for periodically and distributionally output to the first lookup table (LUT A) 405 and the second lookup table (LUT B) 406.

Distributed digital image density signal is converted into digital data by the first lookup table (LUT A) 405 and the second lookup table (LUT B) 406 (having different properties, and further converted and synthesized into an analog image density signal, and then input to the comparison circuit 402.

Figure 7A:
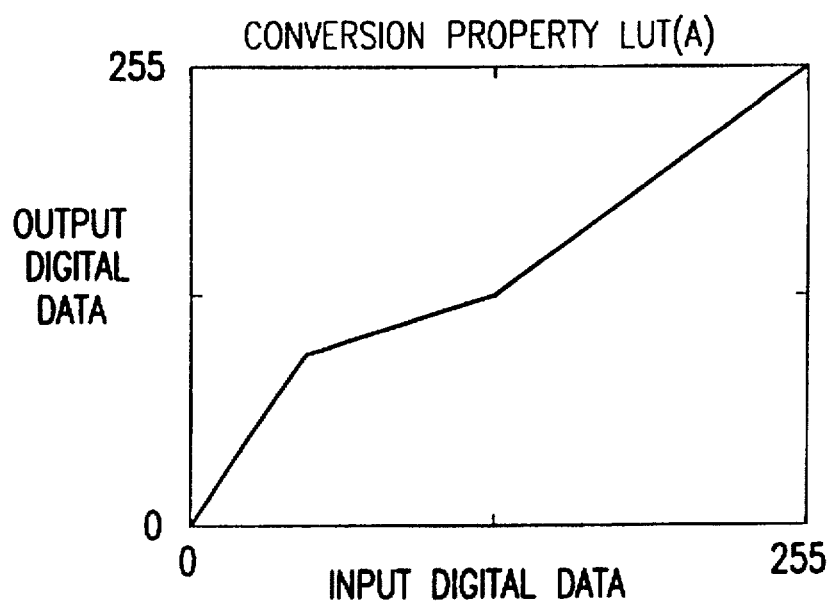
FIGS. 7(a) and 7(b) show examples of data conversion properties of the LUT of the image formation apparatus according to the present invention.
Figure 7B:
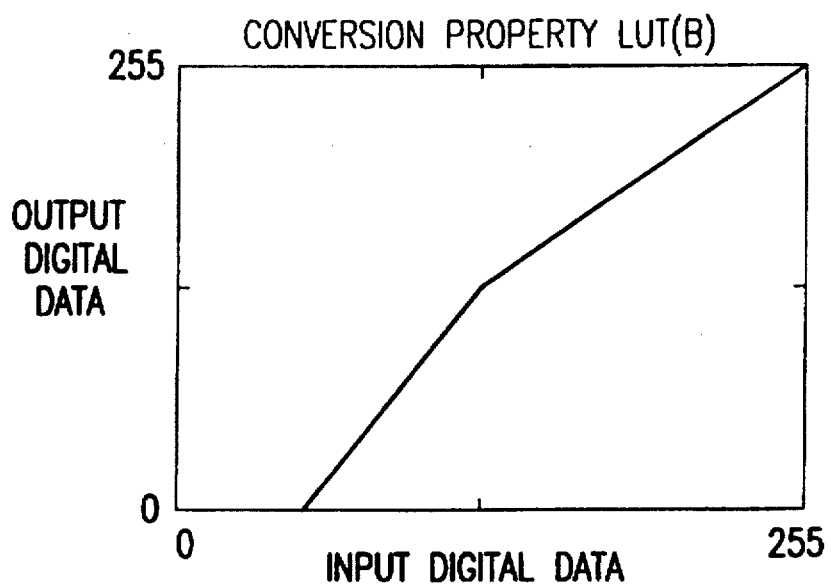
Figure 8:
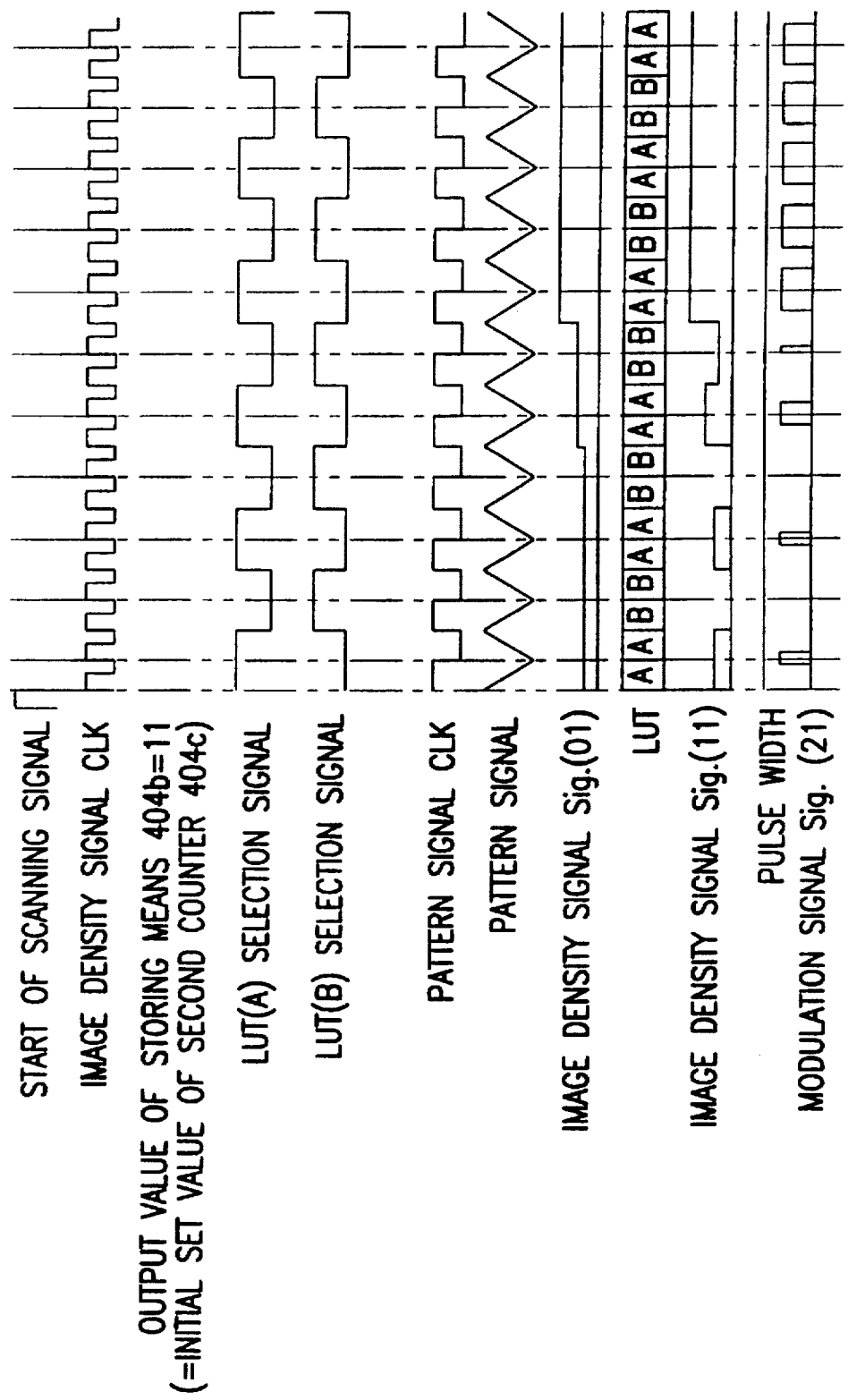
FIG. 8 shows a waveform generation process of the pulse width modulation means of the image formation apparatus according to the present invention.
Figure 9:
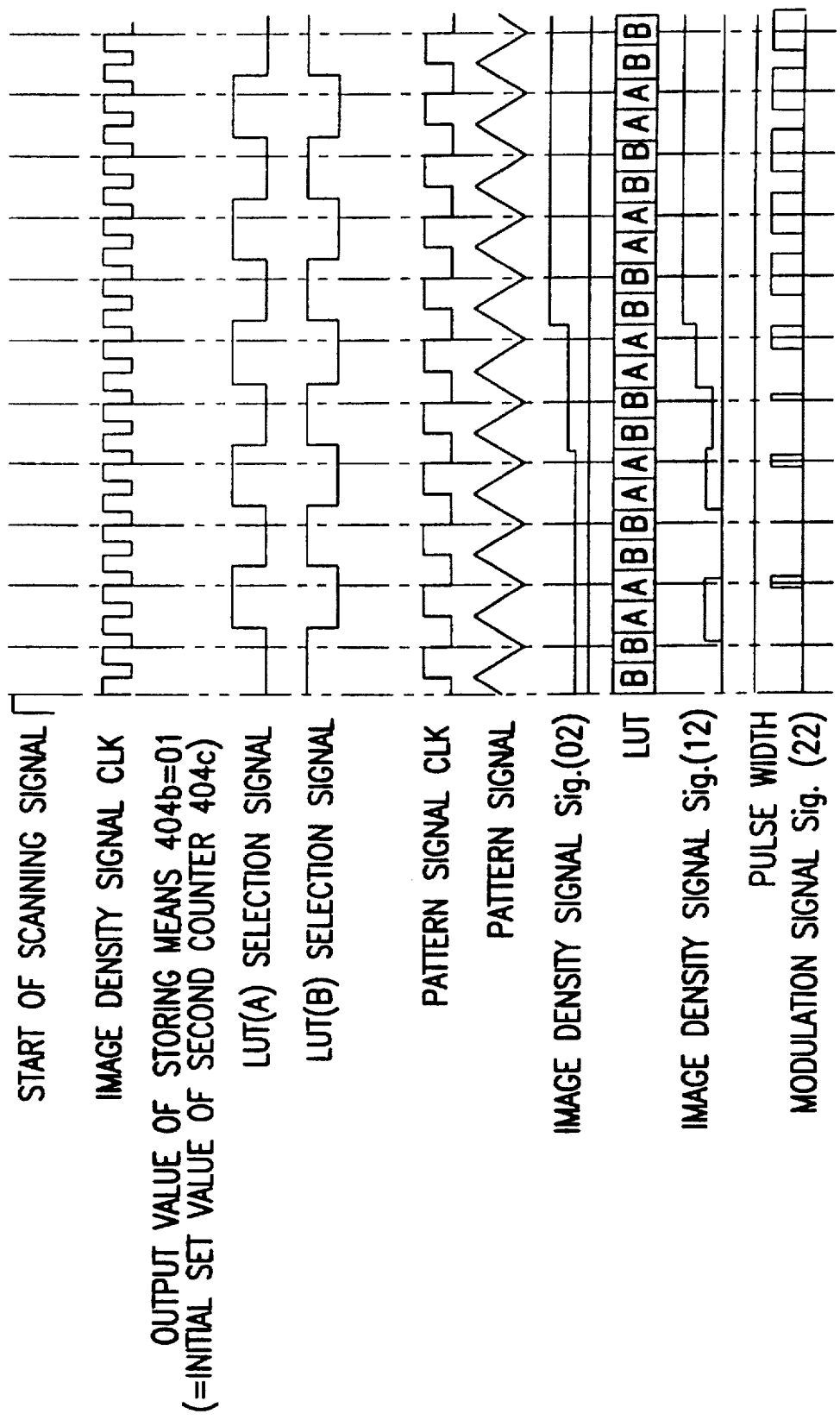
FIG. 9 shows a waveform generation process of the pulse width modulation means of the image formation apparatus according to the present invention.
Figure 10:
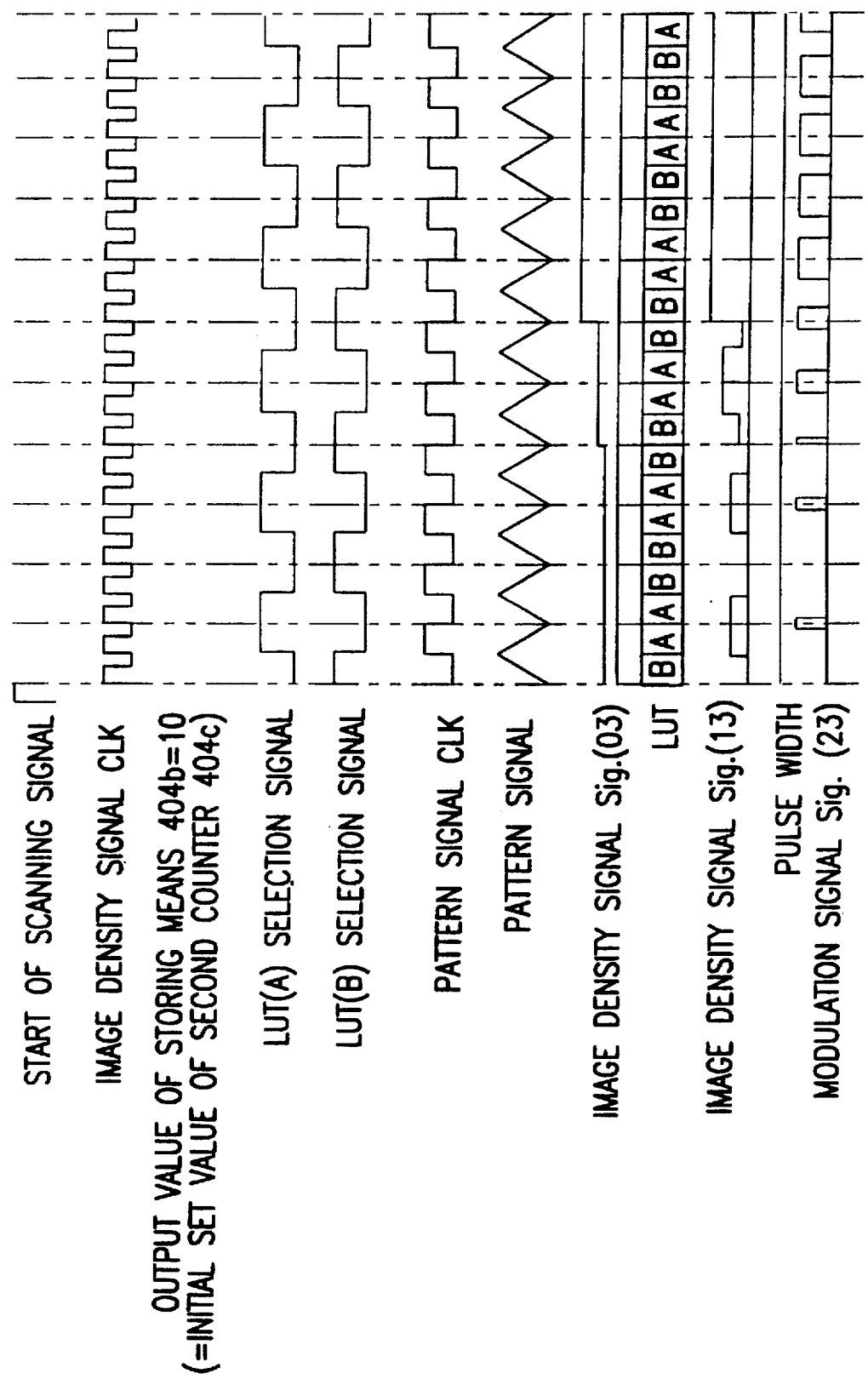
FIG. 10 shows a waveform generation process of the pulse width modulation means of the image formation apparatus according to the present invention.

FIGS. 7(a) and 7(b) show conversion properties of the first lookup table (LUT A) 405 and the second lookup table (LUT B) 406 in the case where 8 bits of input digital data is converted into 8 bits of output digital data.

The triangular wave oscillator 401 generates two types of pattern signal having triangular waveform (a modulation reference wave signal for pulse width modulation to form a screen pattern). The periods of respective pattern signals corresponds to the cases of 400 line per inch (hereinafter, referred to as Ipi) and 200 Ipi. Since the spot diameter ($1/e^2$) of the light beam in the direction of the main scanning on the light-sensitive member 1 is set to be 75 μm, the values of D in these cases are 1.17 for 400 Ipi and 0.59 for 200 Ipi.

The timing signal generation circuit 409 decrements the standard clock signal 403 to double period, for example, based on the SOS signal and the color signal to output the pattern signal clock. The delay selection circuit 410 selects the pattern signal clock generated by the timing signal generation circuit 409, and outputs the pattern signal clock to the delay circuit 411 based on the counting of the SOS signal. The delay circuit 411 determines the delay time depending on which line the pattern signal clock passes through, thereby the pattern signal clocks having the same period and different delay time for each of lines are output.

For example, for generating a screen angle of −63.4° which corresponds to 200 Ipi, in the pattern signal clock having a period corresponding to 200 Ipi, the pattern signal clocks in the second, third and fourth lines are delayed by 1/4 clock, 2/4 clock and 3/4 clock, respectively, compared to the pattern signal clock in the first line. For generating a screen angle of +63.4°, the pattern signal clocks in the second, third and fourth lines are delayed by 3/4 clock, 2/4 clock and 1/4 clock, respectively, compared to the pattern signal clock in the first line in the case of pattern signal clock having a period which corresponds to 200 Ipi.

Figure 11:
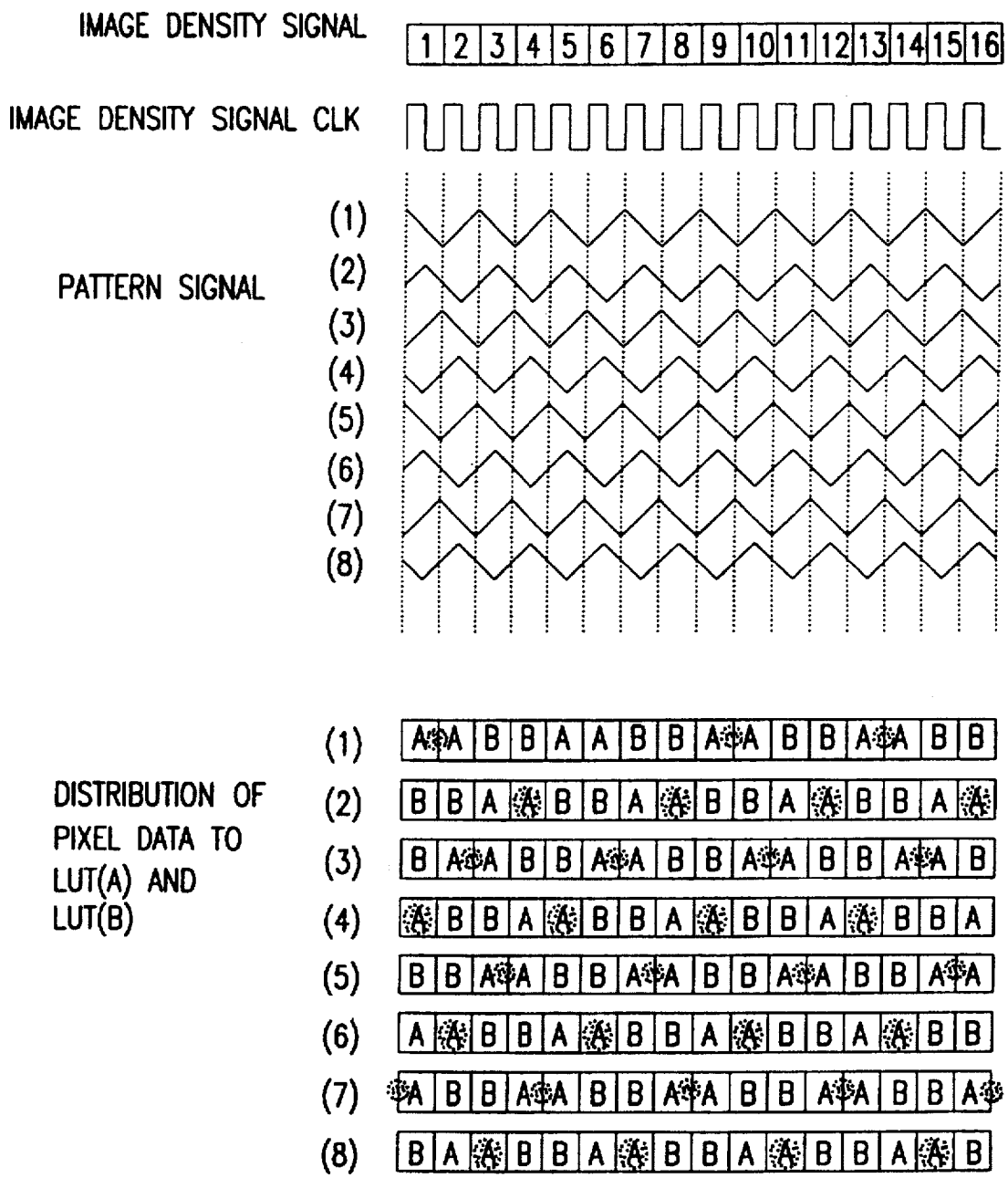
FIG. 11 shows a waveform generation process of the pulse width modulation means of the image formation apparatus according to the present invention.
Figure 12:
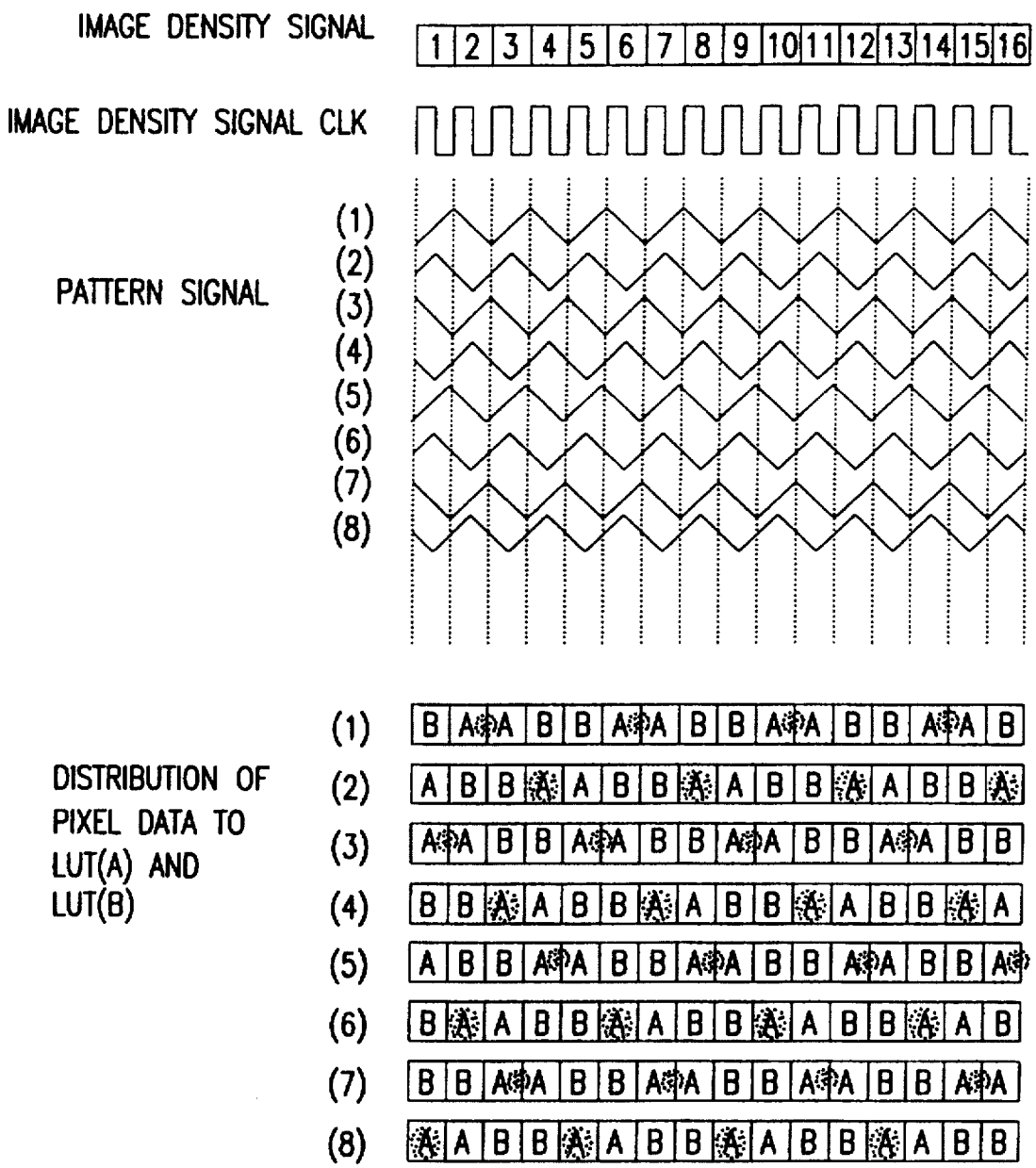
FIG. 12 shows a waveform generation process of the pulse width modulation means of the image formation apparatus according to the present invention.
Figure 14A:
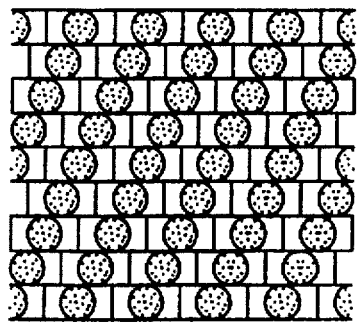
FIG. 14 shows pixel arrangements in the image formation apparatus according to the present invention.

If the pattern signal clock with different delay time for each line is input to the triangular wave oscillator 401 with a 4line period, a pattern signal having a period corresponding to 200 Ipi which varies the delay time in the 4line period, as shown in FIGS. 11 and 12, is output by the triangular wave oscillator 401 and then input to one of the terminals of the comparator 402. At that time, if an analog pixel signal having a uniform level is input to another terminal of the comparator 402, for example, the analog pixel signal is compared with the pattern signal in every line, the image data is as shown in FIGS. 13(a) and 14(a), thus forming screen angles of −63.420 and +63.4° corresponding to 200 Ipi.

The waveform selection circuit 407 selects a waveform in accordance with a halftone image/character image discrimination signal output by a halftone image/character image discrimination means (not shown in the figure).

If an image is determined to be a character image in accordance with the halftone image/character image discrimination signal, a pattern signal corresponding to 400 Ipi is selected. The pattern signal corresponding to 400 Ipi is generated by the pattern signal clock which does not pass through the delay circuit 411. On the other hand, if an image is determined to be a halftone image, a pattern signal corresponding to 200 Ipi is selected.

The comparison circuit 402 compares size of each pattern signal with that of the analog image density signal and generates a pulse width modulation signal.

As shown in FIG. 11, FIGS. 8 through 10 show a process of waveform generation of the pulse width modulation device according to the present invention in the case where the phase of the pattern signal having a period corresponding to 200 Ipi is shifted by 1/4 phase per every sub scanning at 4-sub scanning period.

First, an image density signal Sig(01) is input to the LUT selection circuit 404 based on the count of the standard clock signal, the color signal and the SOS signal, and then periodically distributed to the first lookup table (LUT A) 405 and the second lookup table (LUT B) 406 for generating Sig(A) and Sig(B). Sig(A) and Sig(B) are synthesized by a D/A converter 408 to generate an analog image density signal Sig(11). The size of the analog image density signal Sig(11) is compared with that of the pattern signal having triangular waveform corresponding to 200 Ipi generated by the triangular wave oscillator 401 and a pulse width modulation signal Sig(21) is generated. The on-off control of a semiconductor laser is performed in accordance with the pulse width modulation signal Sig(21), whereby light beam scanning for a single line is finished, that is, an electrostatic latent image for a single line is formed.

Then the SOS signal for detecting the timing of start for light beam scanning is generated and light beam scanning for the next single line is started in accordance with the count of the standard clock signal, color signal and SOS signal. The SOS signal is counted by the counter 404a of the LUT selection circuit 404. The selector 404b performs setting of the counter 404c based on the output of the counter 404a and the color signal, and changes the order of distribution of the image density signal Sig(02) to the first lookup table (LUT A) 405 and the second lookup table (LUT B)

406. The image density signal Sig(02) is input to the LUT selection circuit 404 and periodically distributed to the first lookup table (LUT A) 405 and the second lookup table (LUT B) 406 with a desired phase to generate Sig(A) and Sig(B). The pulse width modulation signal Sig(22) is generated in the same way as described above. The on-off control is performed on the semiconductor laser in accordance with the pulse width modulation signal Sig(22) and light beam scanning is finished, thus forming the electrostatic latent image for another single line. In total, the electrostatic latent image for two lines is completed.

Also in the third line, the image density signal Sig(03) is input to the LUT selection circuit 404 in accordance with the count of the standard clock signal, the color signal and the SOS signal to generate the pulse width modulation signal Sig(23) in the same way as described above. The on-off control is performed on the semiconductor laser in accordance with the pulse width modulation signal Sig(23), thus forming the electrostatic latent image for the third line.

In this way, the LUT selection circuit 404 changes the order of distribution of the image density signal to the first lookup table (LUT A) 405 and the second lookup table (LUT B) 406 per every scanning (every line) at the period of 8 scanning processes (8line period), as shown in FIGS. 11 and 12. As a result, portions in which the electrostatic latent images are formed if a uniform low density signal is input are indicated by dots in these figures.

Second Embodiment

Figure 15:
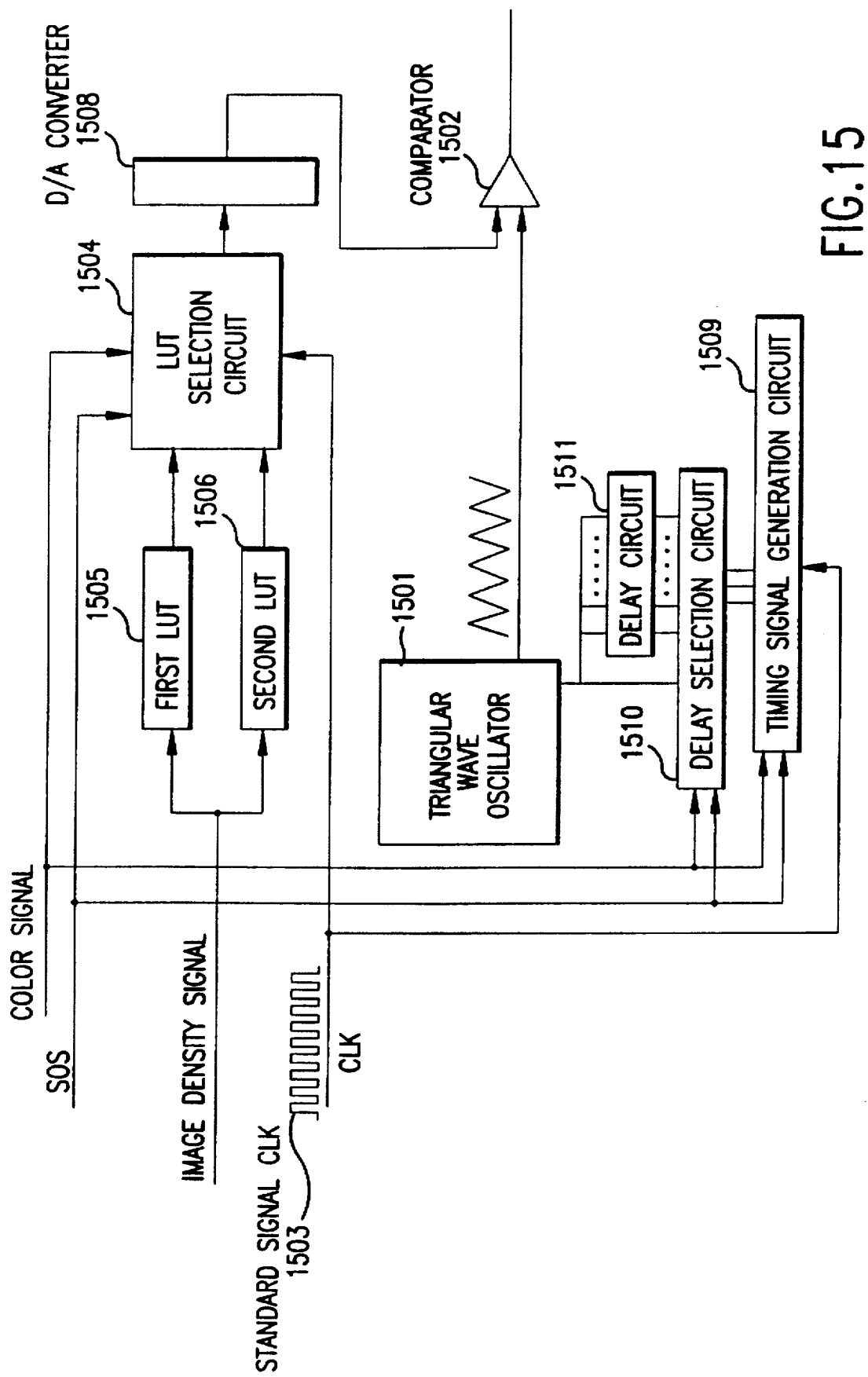
FIG. 15 shows the construction of the pulse width modulation means of a second embodiment of the image formation apparatus according to the present invention.
Figure 16A:
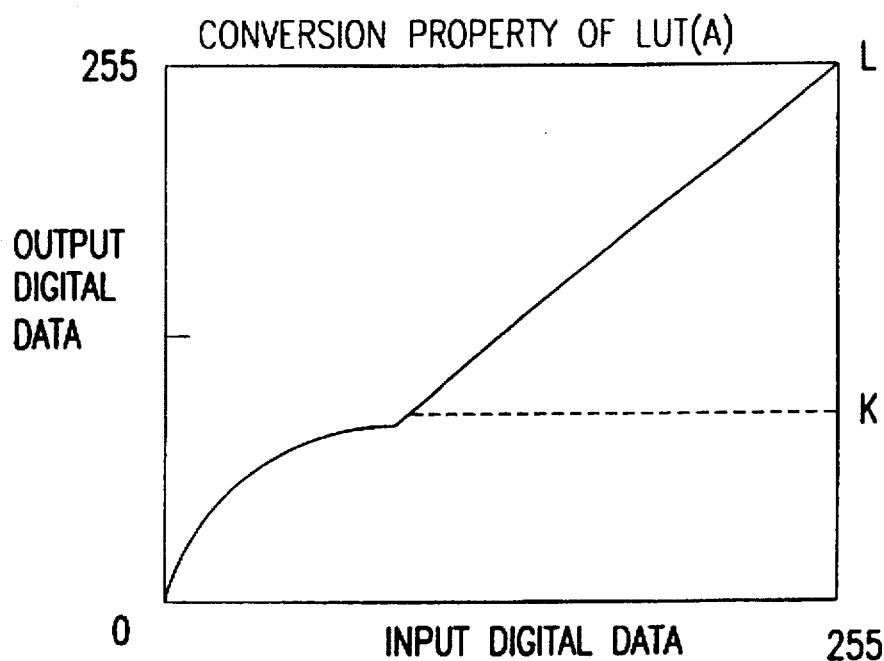
FIGS. 16(a) and 16(b) show examples of data conversion properties of the LUT of the image formation apparatus according to the present invention.
Figure 16B:
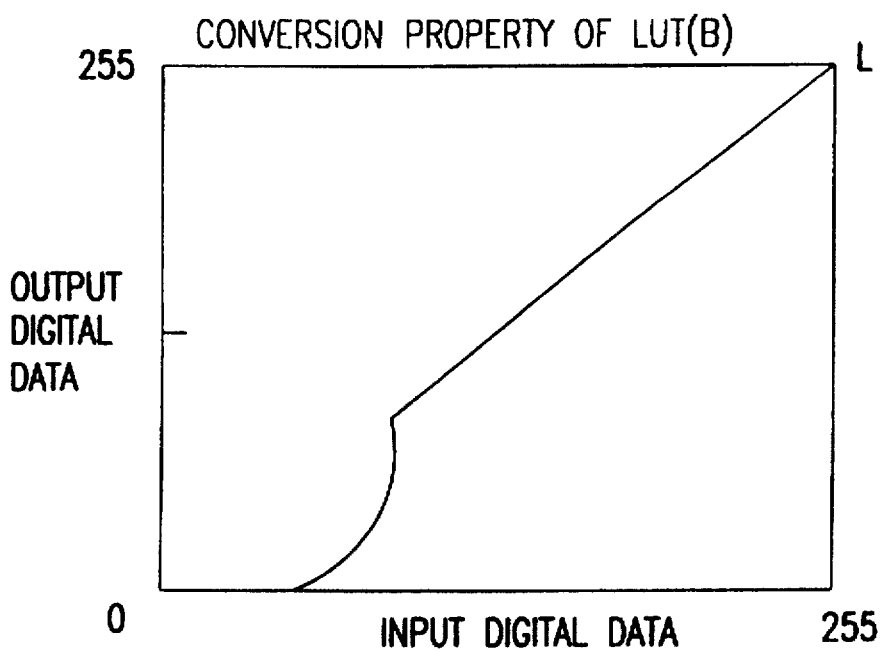

FIG. 15 shows a pulse width modulation device of a second embodiment of the image formation apparatus according to the present invention, which inputs image density signals to a first lookup table (LUT A) 1505 and a second lookup table (LUT B) 1506 in parallel and carries out signal conversion and selects signals by an LUT selection circuit 1504 in accordance with the count of a standard clock signal, a color signal and an SOS signal to synthesize the selected signals and output them to a D/A converter 1508. In FIG. 16, conversion properties of the first lookup table (LUT A) 1505 and the second lookup table (LUT B) 1506, both of which convert 8 bits input digital data into 8 bits output digital data. The construction of a triangular pulse wave oscillator 1501 generating a pattern signal corresponding to 200 lpi may be the same as that of the first embodiment.

Third Embodiment

Figure 17:
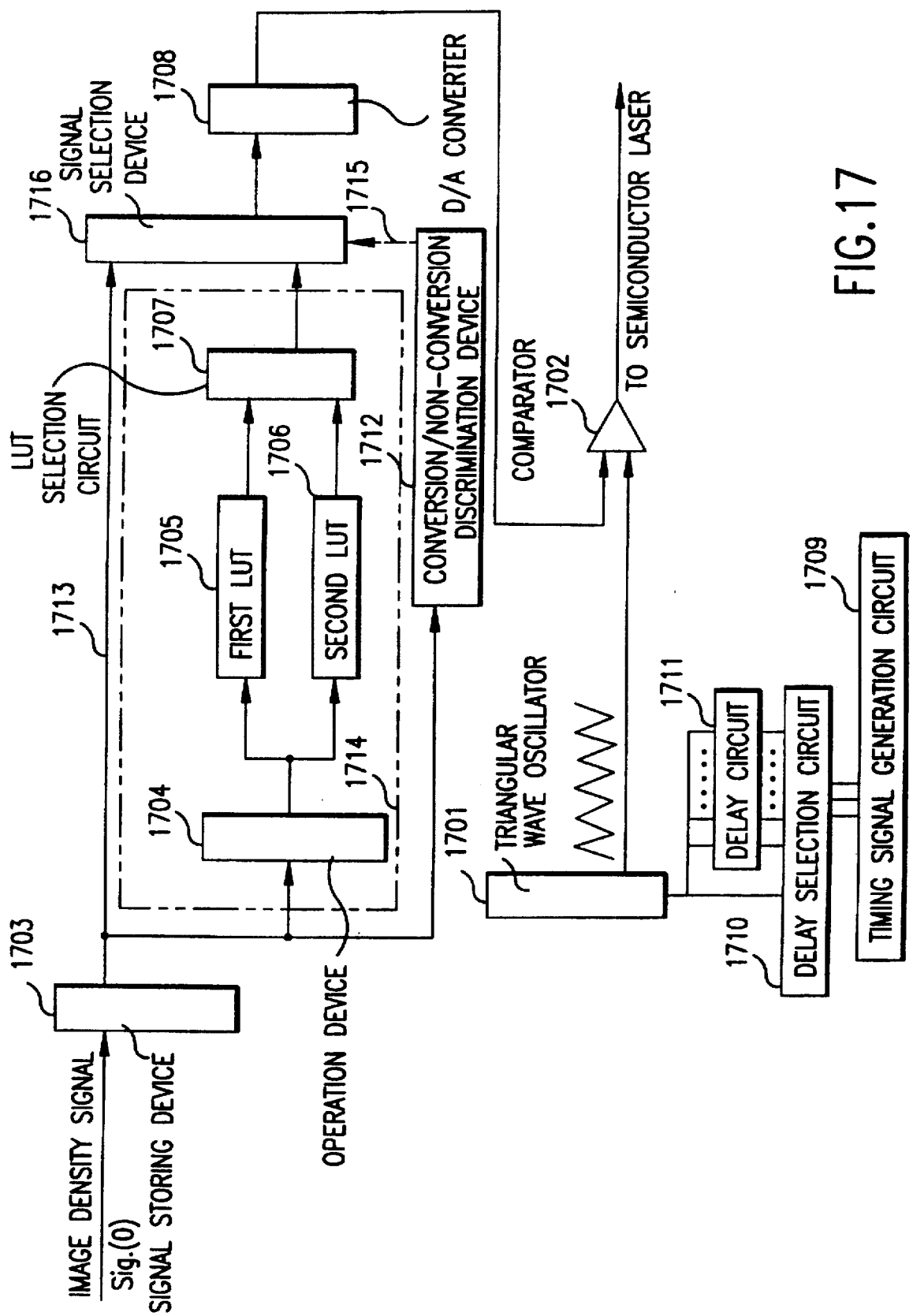
FIG. 17 shows the construction of the pulse width modulation means of a second embodiment of the image formation apparatus according to the present invention.

FIG. 17 shows the construction of a third embodiment of the image formation apparatus according to the present invention, which includes a signal storing device 1703, an operation device 1704, a conversion/non-conversion discrimination device 1712 and a signal selection device 1716 for realizing high reproduction capability of a line image.

For example, digital image density signals of 400 dpi resolution arranged in the direction of main scanning are taken by 4 data and stored by the signal storing device 1703, and then forwarded to the conversion/nonconversion discrimination device 1712, an image signal line-reduction conversion device 1714 and a non-conversion path 1713.

The conversion/non-conversion discrimination device 1712 carries out conversion/non-conversion discrimination based on the result of comparison of value of each of 4 image density signals having been stored with a predetermined threshold value, and transmits a conversion/nonconversion discrimination signal to the signal selection device 1716. In discrimination of the conversion/nonconversion discrimination device 1712 of this embodiment, a discrimination signal, which indicates that conversion is carried out when all values of 4 image density signals having been stored are smaller than the threshold value, and that conversion is not carried out in other cases, is provided to the signal selection device 1716.

Moreover, a logic may be added such that differences between values of 4 image density signals having been stored are calculated to be compared with a predetermined threshold difference value and conversion is carried out if all the differences of values are smaller than the threshold difference value, otherwise non-conversion is carried out.

The non-conversion path 1713 is directly connected to the signal selection device 1716 so as to transmit the image density signal having been stored to the signal selection device 1716 without conversion.

The signal transmitted to the image density line-reduction conversion device 1714 is further transmitted to the operation device 1704 which generates an image density signal representing 4 data of the image density signals having been stored. In this embodiment, the representative signal is generated by mean operation on 4 data.

The first lookup table (LUT A) 1705 and the second lookup table (LUT B) 1706 convert the data output by the operation device 1704 to generate image density signals respectively. As same as the first embodiment, the LUT selection circuit 1707 selects two image density signals converted by the first lookup table (LUT A) 1705 and the second lookup table (LUT B) 1706 in order with desired phases in accordance with the count of the standard clock signal, the color signal and the SOS signal (not shown in the figure), and transmits them to the signal selection device 1716.

The signal selection device 1716 selects either image density signal without conversion transmitted from the non-conversion path 1713 or image density signal converted by the conversion device 1714 in accordance with the conversion/non-conversion discrimination signal. Selected image density signal is transmitted to the D/A converter 1708 which converts the transmitted digital image density signal into an analog image density signal. The comparison circuit 1702 compares the size of the pattern signal having triangular wave with the size of the analog image density signal to generate a pulse width modulation signal.

As described above, in the case where a halftone image is formed by utilizing the pulse width modulation device of the first embodiment of the image formation apparatus according to the present invention, the halftone image can be formed with 200 lpi screen having screen angle of −63.4° or +63.4° as same as ordinary pulse width modulation method on condition that the digital image density signal is 50% or more in the halftone area. FIGS. 13(a) and 14(a) show pixel arrangements when the image density signal is 60%.

Figure 14B:
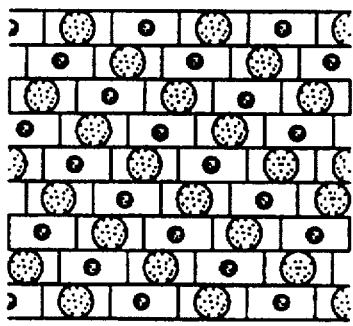
Figure 14C:
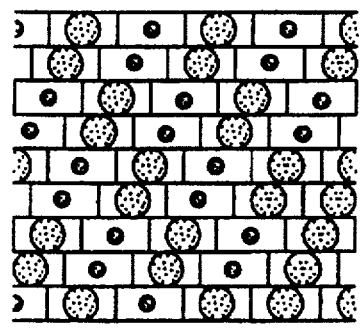
Figure 14D:
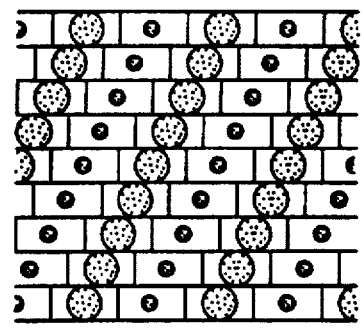

A halftone area where the image density signal is 20% or more and less than 50% is constituted alternately by a portion where the image density signal is converted by the first lookup table (LUT A) 405 and the D/A converter and a portion where the image density signal is converted by the second lookup table (LUT B) 46 and the D/A converter, and in an area where the digital image density signal is about 20%, the portion where the image density signal is converted by the second lookup table (LUT B) 406 and the D/A converter has little or no contribution to image formation. Pixels of different sizes are alternately formed in the direction of main scanning and sub scanning by operating the order of distribution of the image density signal to the first lookup table (LUT A) 405 and the second lookup table (LUT B) 406 at the timing synchronizing with the image density signal clock and further changing it in the direction of sub scanning periodically. FIGS. 13(b) and 14(b) show pixel arrangements in the case where the image density signal is 30% which corresponds to 200 Ipi screen with a screen angle of −63.4° or +63.4°. FIGS. 13(c), 13(d), 14(c) and 14(d) show pixel arrangements formed by changing the order of periodic distribution of the image density signal to the first lookup table (LUT A) 405 and the second lookup table (LUT B) 406.

Figure 14E:
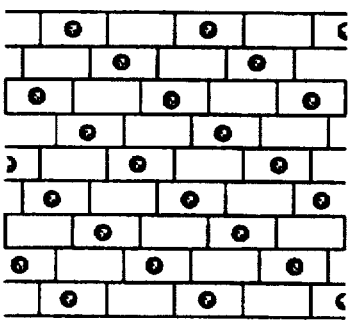
Figure 14F:
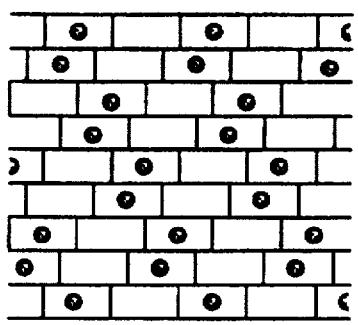
Figure 14G:
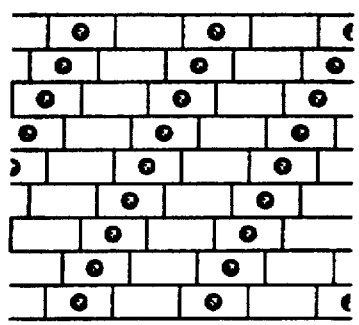

Moreover, in a halftone area where the digital image density signal is less than 20%, only the portion where the image density signal is converted by the first lookup table (LUT A) 405 and the D/A converter distributes to image formation, and a halftone image is formed with the same pixel density as that of a 100 Ipi screen, which is half density of the 200 Ipi screen, since the order of distribution of the image density signal to the first lookup table (LUT A) 405 and the second lookup table (LUT B) 406 is operated at the timing synchronizing with the image density signal clock and further changed periodically in the direction of sub scanning. Therefore, reproducibility of dots and lines in a low density portion and stability in reproduction of gradation or tones depending on environments can be improved. FIGS. 13(e) and 14(e) show pixel arrangements in the case where the image density signal is 15% which corresponds to the 200 Ipi screen with a screen angle of −63.4° or +63.4°. FIGS. 13(f), 13(g), 14(f) and 14(g) show pixel arrangements formed by changing the order of periodic distribution of the image density signal to the first lookup table (LUT A) 405 and the second lookup table (LUT B) 406.

In the second embodiment, as same as in the first embodiment, pixel arrangements shown in FIGS. 13(a)–13(g), 14(a)–14(g) can be formed by changing the order of periodic distribution of the image density signal to the first lookup table (LUT A) 1505 and the second lookup table (LUT B) 1506 by the LUT selection circuit 1504 in accordance with the count of the standard clock signal, the color signal and the SOS signal.

In the third embodiment, pixel arrangements shown in FIGS. 13(a)–(g) and 14(a)–(g) can be also formed as same as in the first embodiment by changing the order of periodic distribution of the image density signal converted by the operation device 1704 to the first lookup table (LUT A) 1705 and the second lookup table (LUT B) 1706 by the LUT selection circuit 1707.

Figure 18A:
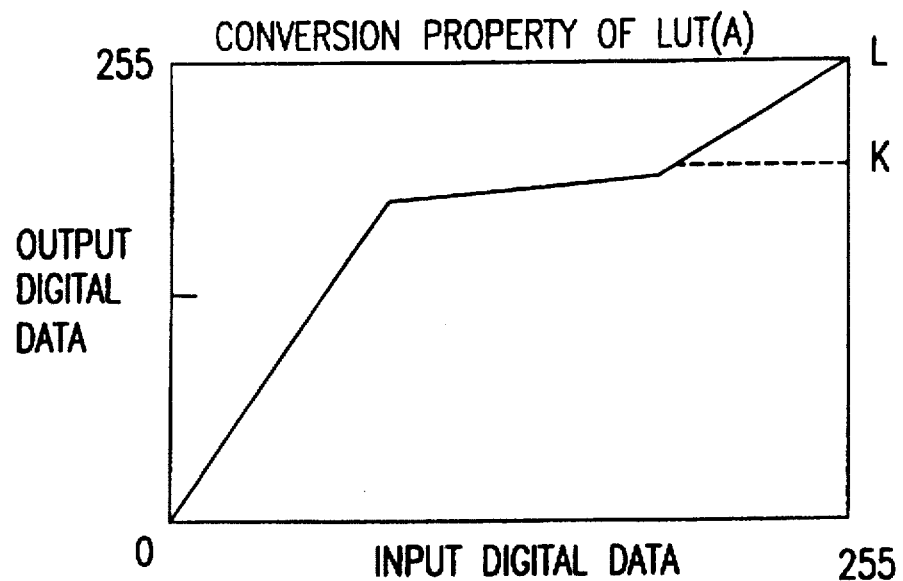
FIGS. 18(a) and 18(b) show data conversion properties of an LUT of a comparative example.
Figure 18B:
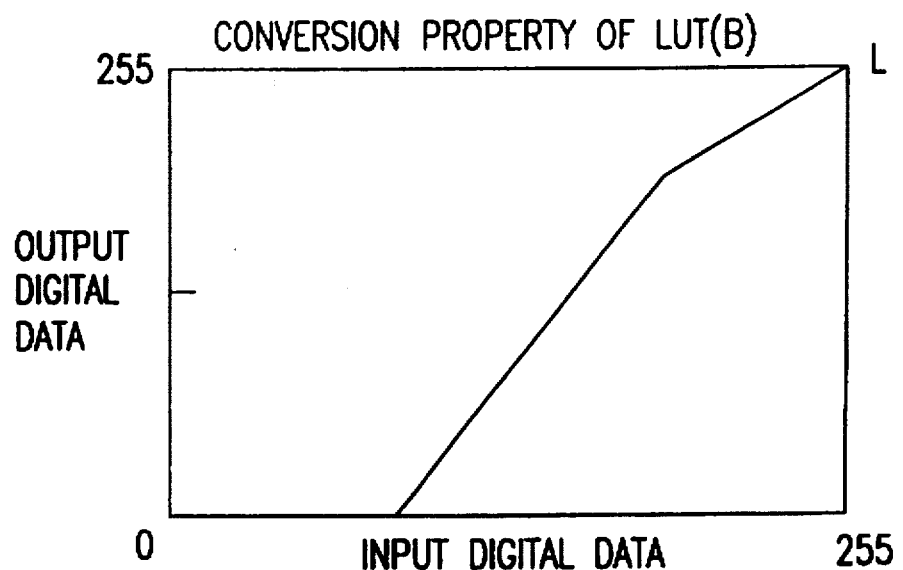
Figure 19A:
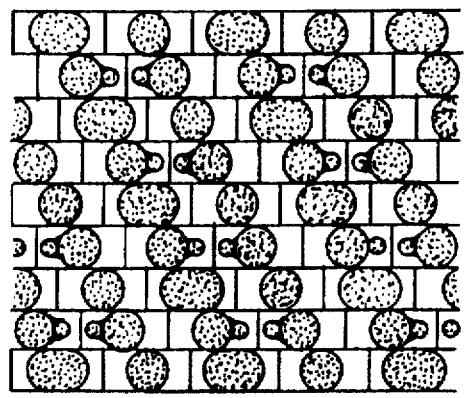
FIGS. 19(a) and 19(b) show pixel arrangements in an image formation apparatus of the comparative example.
Figure 19B:
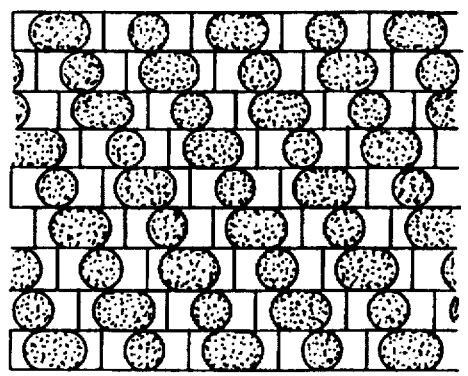

As a comparing example, image formation is carried out in the same way as that of the first embodiment except that the image density signal conversion means is changed to a first lookup table (LUT A) and the second lookup table (LUT B) having conversion properties shown in FIGS. 18(a) and 18(b), respectively. FIG. 19(a) shows pixel arrangements in the case where the image density signal is 60% which corresponds to the 200 Ipi screen with a screen angle of −63.4°. As shown in the figure, if the largest converted value of the image density signal in an area where at least two image density signal conversion means have different properties exceeds 50% of the number of gradation of the image density signal, the desired image construction as shown in FIG. 19(b) cannot be obtained.

Figure 20A:
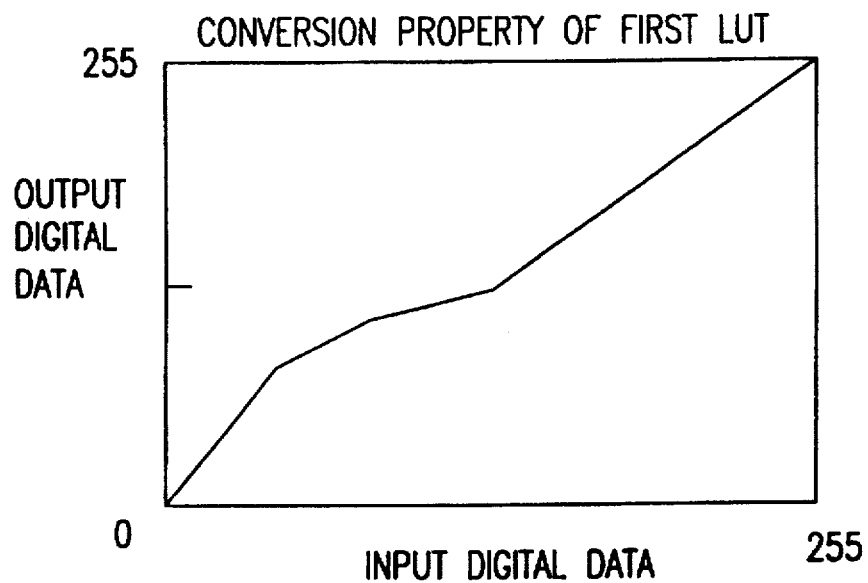
FIGS. 20(a) and 20(b) show data conversion properties of the LUT of the image formation apparatus according to the present invention.
Figure 20B:
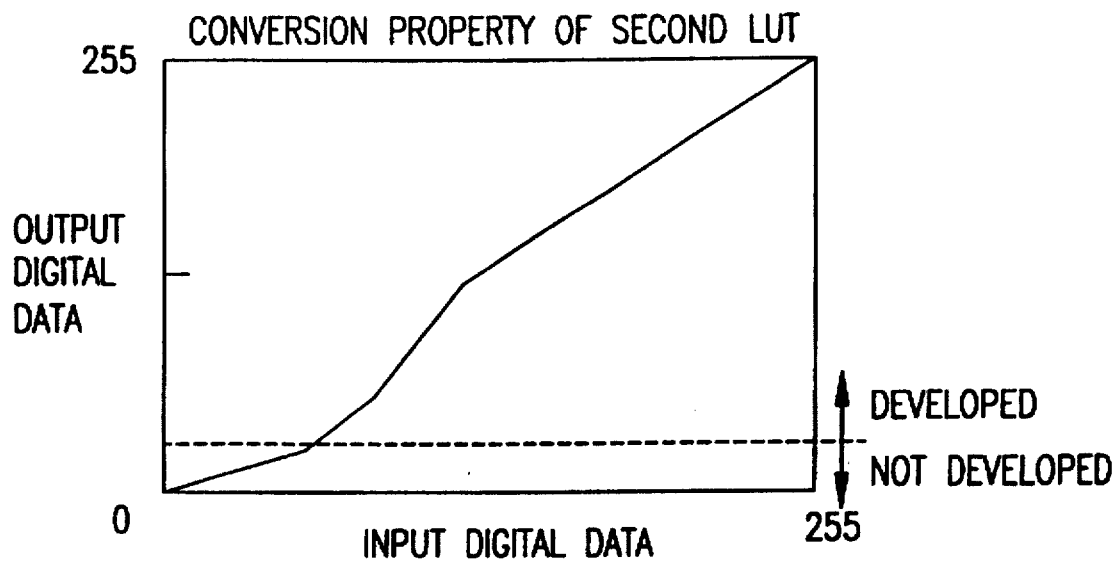
Figure 22B:
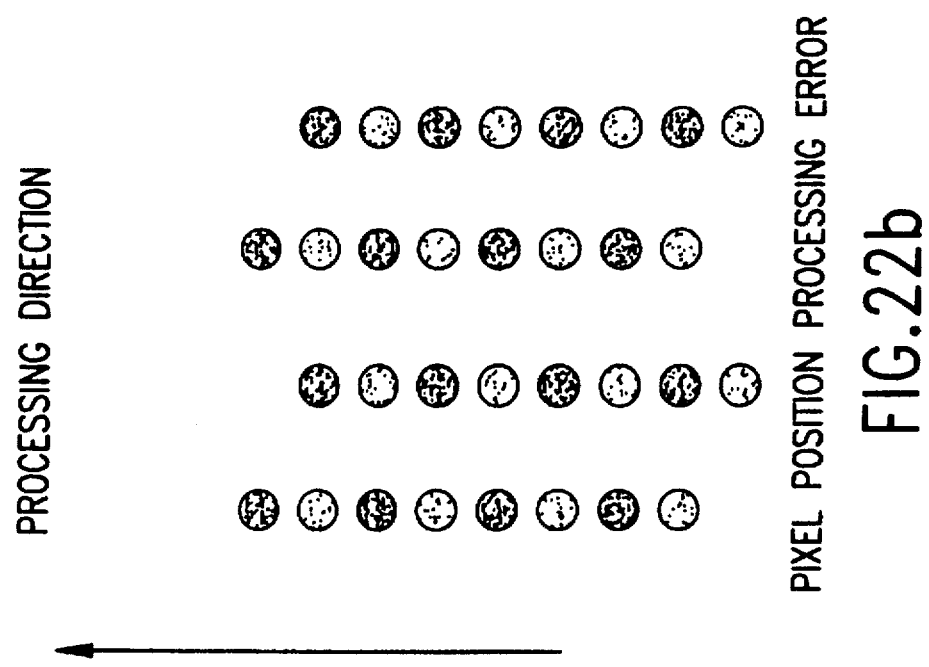
FIG. 22 is a view explaining generation of pixel registration error in a processing direction.
Figure 22A:
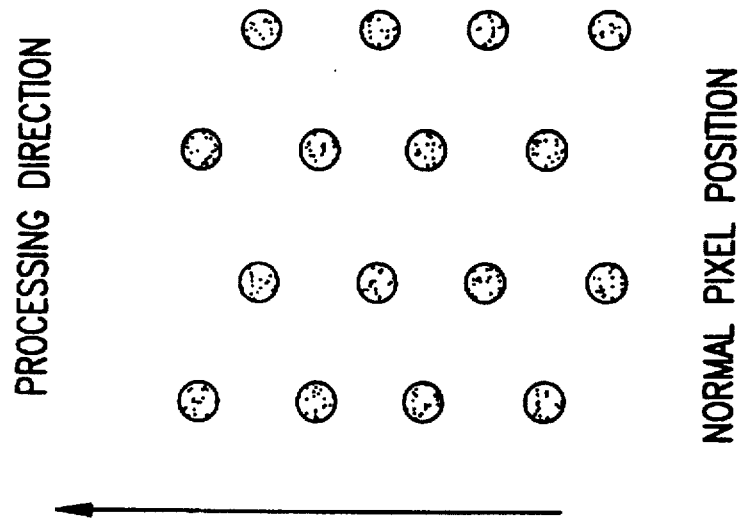
Figure 23:
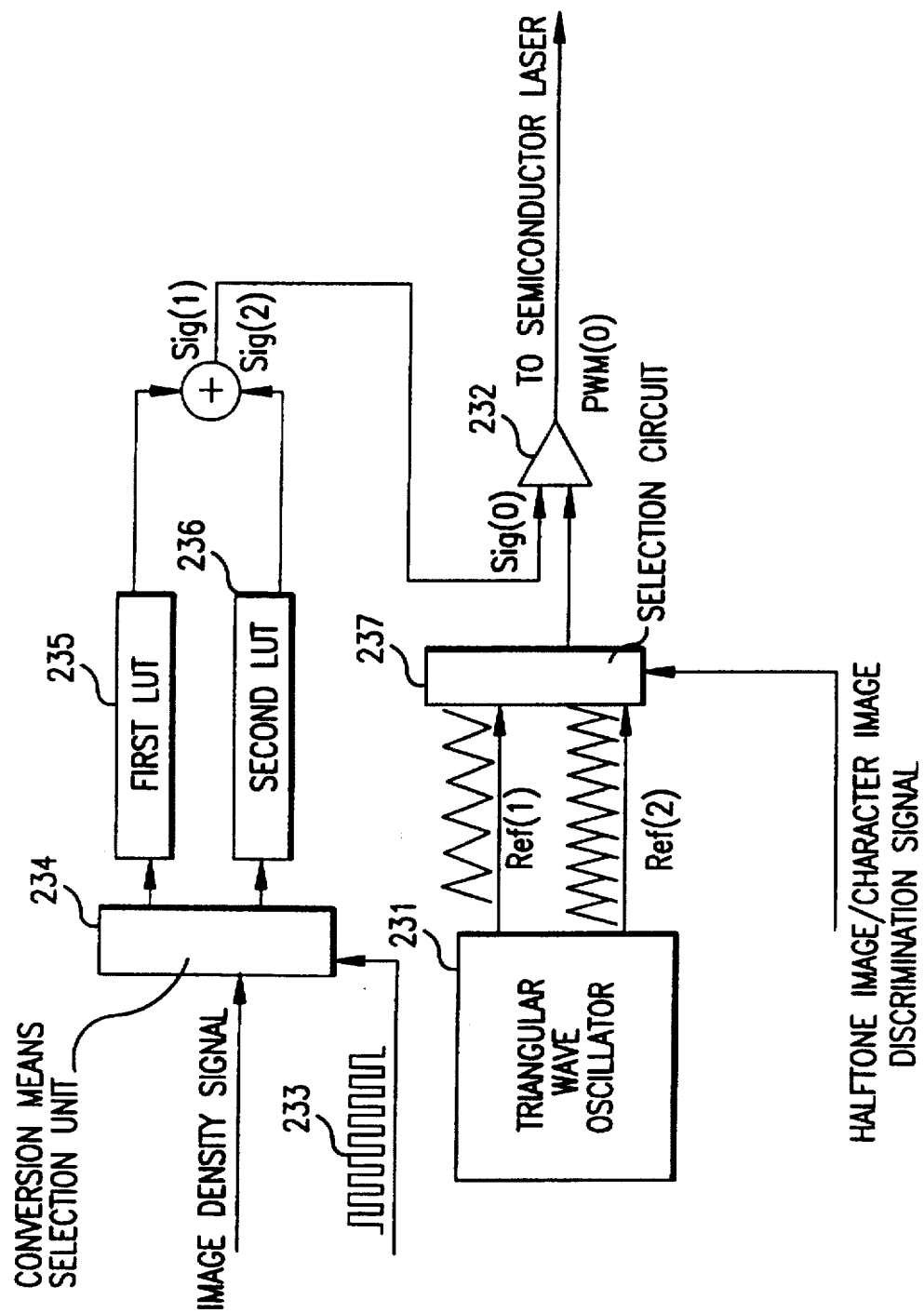
FIG. 23 shows the construction of a conventional image formation apparatus.

In each of the embodiments described above, at least two image density signal conversion means have property that the output of one of the image density conversion means for the low density portion is 0. However, it is possible to make the output of one of the image density signal conversion means for the low density portion to be a value within a range corresponding to the portion not to be developed. An example of this property of the image density conversion means is shown in FIGS. 20(a) and 20(b).

In the light beam scanning device shown in FIG. 4, image development is carried out for laser lightening for 5% pulse width (13 digital data of 8 bits) or more because a laser diode does not respond to an extremely small input signal and the development bias potential is provided to restrain attachment of toner to a blank portion. In the property shown in FIG. 20(b), the output for the low density portion is set to be less than the above value; therefore, the output for the low density portion is not developed. On the other hand, in the property shown in FIG. 20(a), there is an area in the low density portion where the output is set to be at least 13 digital data, and accordingly the output is developed in the area.

In short, dots or lines of the input image are concentrated, whereby it is possible to perform image formation with reduced lines for screen image of low density as same as in each of the embodiments described previously.

An experiment has been made to integrally evaluate the stability in reproduction of gradation and tones depending on environments and unevenness of third color of the images formed by utilizing the pulse width modulation device of the first embodiment of the image formation apparatus according to the present invention and by the comparative example described above. A modified machine of "A-Color", a product name of a digital color copying machine manufactured by Fuji Xerox Co., Ltd. is used for the experiment. Conditions in the experiment and results are shown in FIG. 21. All images are formed by adopting a pattern signal with triangular pulse wave having a period corresponding to the 200 Ipi screen.

Among the conditions shown in FIG. 21, "+90° screen angle" means a conventional 200 Ipi screen in which phase shift per every sub scanning does not occur. "+90° screen angle with line reduction processing" means that the line reduction process suggested in Japanese Patent Application No. Hei. 6-24976 by inventors of the present invention is performed.

As it is clear from FIG. 21, according to the present invention, the stability in reproduction of gradation and tones depending on environments in the low density portion is improved, and moreover, change of hues or zonal uneven coloring caused by slight shifting of pixel arrangement period on the recording sheet owing to machine oscillation, irregular scanning in a printer, registration error in paper feeding, uneven paper carrying speed or the like are hard to be recognized, thus improving the image quality.

According to the present invention, line reduction in the low density portion of the image density signal and formation of an image with a predetermined screen angle are made possible because plural image density signal conversion means having different gradation reproduction properties are operated at the timing synchronizing with an image density signal clock, and the plural image density signal conversion means are periodically selected in accordance with the selection signal with a period longer than that of the image density signal clock, and moreover, the phase of the selection signal is changed per one or plural processing of exposure scanning. Consequently, it is possible to improve the stability in reproduction of gradation or tones depending on environments and make hard to recognize uneven coloring or change of hues caused by, for example, pixel registration error, thus realizing high image quality without using a process controller, a luminous intensity changing device which are complex and expensive, or a beam imaging optical system which is precise and expensive, also.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus comprising:
   first image density signal conversion means having a first conversion property for converting a multi-valued image density input signal to an image density output signal at a timing synchronizing with an image density signal clock;
   second image density signal conversion means having a second conversion property different from said first conversion property for converting a part of said image density input signal corresponding to a low density portion to an image density output signal indicating a value within a range in which an image is not developed;
   selection signal generation means for outputting a selection signal having a period longer than that of said image density signal clock to select said first or second image density signal conversion means in a predetermined order, a phase of said selection signal being shifted in turn per every one or more main scanning synchronizing signals;
   pattern signal generation means for generating a pattern signal having a period longer than that of said image density signal clock;
   phase control means for shifting the phase of said pattern signal generated by said pattern signal generation means per every one or more main scanning synchronizing signals to form a screen image having a predetermined screen angle;
   pulse width modulation means for outputting a pulse width modulation signal generated by modulating pulse width of said image density output signal output from said first and second image density signal conversion means utilizing said pattern signal; and
   image formation means for forming an image in accordance with said pulse width modulation signal output from said pulse width modulation means.

2. The image forming apparatus according to claim 1, wherein said first conversion property is to convert the part of said image density input signal corresponding to the low density portion to an image density output signal indicating a value within a range in which an image is developed.

3. The image forming apparatus according to claim 1, wherein said selection signal generation means comprises:
   a first counter for counting said main scanning synchronizing signals and outputting a signal showing the number of said main scanning synchronizing signals;
   memory means for storing an initial counter value to determine the phase of said selection signal and selecting and outputting said initial counter value in accordance with said signal output from said first counter; and
   a second counter initialized by said initial counter value output from said memory means for dividing said image density signal clock to generate said selection signal.

4. The image forming apparatus according to claim 2, wherein said selection signal generation means comprises:
   a first counter for counting said main scanning synchronizing signals and outputting a signal showing the number of said main scanning synchronizing signals;
   memory means for storing an initial counter value to determine the phase of said selection signal and selecting and outputting said initial counter value in accordance with said signal output from said first counter; and
   a second counter initialized by said initial counter value output from said memory means for dividing said image density signal clock to generate said selection signal.

5. The image forming apparatus according to claim 1, wherein said selection signal generation means comprises:
   a first counter for counting said main scanning synchronizing signals and outputting a signal showing the number of said main scanning synchronizing signals;
   memory means for storing a value indicating plural phases and outputting said value indicating plural phases in accordance with said signal output from said first counter;
   signal generation means for generating plural signals having different phases by dividing said image density signal clock; and
   selection means for selecting one signal from said plural signals having different phases output from said signal generation means in accordance with the output of said memory means and outputting said selected signal as said selection signal.

6. The image forming apparatus according to claim 2, wherein said selection signal generation means comprises:
   a first counter for counting said main scanning synchronizing signals and outputting a signal showing the number of said main scanning synchronizing signals;
   memory means for storing a value indicating plural phases and outputting said value indicating plural phases in accordance with said signal output from said first counter;
   signal generation means for generating plural signals having different phases by dividing said image density signal clock; and
   selection means for selecting one signal from said plural signals having different phases output from said signal generation means in accordance with the output of said memory means and outputting said selected signal as said selection signal.

7. The image forming apparatus according to claim 1, further comprising:
   values K and L having the following relation $K/L \leq 1/2$, where L is the number of gradations of said image density output signal and K is a maximum value of said image density output signal in an area where said first and second image density signal conversion means have different conversion properties.

8. The image forming apparatus according to claim 2, further comprising:

values K and L having the following relation $$K/L \leq 1/2,$$

where L is the number of gradations of said image density output signal and K is a maximum value of said image density output signal in an area where said first and second image density signal conversion means have different conversion properties.

9. The image forming apparatus according to claim 1, wherein said image formation means comprises:

light beam scanning means for relatively scanning a light-sensitive medium with a light beam;

an image formation optical system for converging the light beam scanned by said light beam scanning means to form a light beam spot of a predetermined size on said light-sensitive medium; and values $d_B$ and $d_p$ having the following relation $$d_B < (1/3) d_p$$

wherein $d_p$ (mm) is a distance between said light beam spots adjacent each other in a main scanning direction on said light-sensitive medium and $d_B$ (mm) is a diameter of said light beam spot in the main scanning direction in forming an image when said image density output signal indicates a value within a range in which said image is not developed.

10. An image forming apparatus comprising:

first image density signal conversion means having a first conversion property for converting a multi-valued image density input signal to an image density output signal;

second image density signal conversion means having a second conversion property different from said first conversion property for converting a part of said image density input signal corresponding to a low density portion to an image density output signal indicating a range in which an image is not developed;

selection signal generation means for outputting a selection signal having a period longer than that of said image density signal clock to select said first or second image density signal conversion means in a predetermined order at a timing synchronizing with an image density signal clock, a phase of said selection signal being shifted in turn per every one or more main scanning synchronizing signals;

pattern signal generation means for generating a pattern signal having a period longer than that of said image density signal clock;

phase control means for shifting the phase of said pattern signal generated by said pattern signal generation means per every one or more main scanning synchronizing signals to form a screen image having a predetermined screen angle;

pulse width modulation means for outputting a pulse width modulation signal generated by modulating pulse width of said image density output signal output from said first and second image density signal conversion means utilizing said pattern signal; and image formation means for forming an image in accordance with said pulse width modulation signal output from said pulse width modulation means.

11. The image forming apparatus according to claim 10, wherein said first conversion property is to convert the part of said image density input signal corresponding to the low density portion to an image density output signal indicating a range in which an image is developed.

12. The image forming apparatus according to claim 10, wherein said selection signal generation means comprises:

a first counter for counting said main scanning synchronizing signals and outputting a signal showing the number of said main scanning synchronizing signals;

memory means for storing an initial counter value to determine the phase of said selection signal and selecting and outputting said initial counter value in accordance with said signal output from said first counter; and a second counter initialized by said initial counter value output from said memory means for dividing said image density signal clock to generate said selection signal.

13. The image forming apparatus according to claim 11, wherein said selection signal generation means comprises:

a first counter for counting said main scanning synchronizing signals and outputting a signal showing the number of said main scanning synchronizing signals;

memory means for storing an initial counter value to determine the phase of said selection signal and selecting and outputting said initial counter value in accordance with said signal output from said first counter; and a second counter initialized by said initial counter value output from said memory means for dividing said image density signal clock to generate said selection signal.

14. The image forming apparatus according to claim 10, wherein said selection signal generation means comprises:

a first counter for counting said main scanning synchronizing signals and outputting a signal showing the number of said main scanning synchronizing signals;

memory means for storing a value indicating plural phases and outputting said value indicating plural phases in accordance with said signal output from said first counter;

signal generation means for generating plural signals having different phases by dividing said image density signal clock; and selection means for selecting one signal from said plural signals having different phases output from said signal generation means in accordance with the output of said memory means and outputting said selected signal as said selection signal.

15. The image forming apparatus according to claim 11, wherein said selection signal generation means comprises:

a first counter for counting said main scanning synchronizing signals and outputting a signal showing the number of said main scanning synchronizing signals;

memory means for storing a value indicating plural phases and outputting said value indicating plural phases in accordance with said signal output from said first counter;

signal generation means for generating plural signals having different phases by dividing said image density signal clock; and selection means for selecting one signal from said plural signals having different phases output from said signal generation means in accordance with the output of said memory means and outputting said selected signal as said selection signal.

16. The image forming apparatus according to claim 10, further comprising:

values K and L having the following relation $$K/L \leq 1/2,$$

wherein L is the number of gradations of said image density output signal and K is a maximum value of an image density output signal in a portion where said first and second image density signal conversion means have different conversion properties.

17. The image forming apparatus according to claim 11, further comprising:

values K and L having the following relation $$K/L \leq 1/2,$$

where L is the number of gradations of said image density output signal and K is a maximum value of said image density output signal in an area where said first and second image density signal conversion means have different conversion properties.

18. The image forming apparatus according to claim 10, wherein said image formation means comprises:
light beam scanning means for relatively scanning a light-sensitive medium with a light beam;
an image formation optical system for converging the light beam scanned by said light beam scanning means to form a light beam spot of a predetermined size on said light-sensitive medium; and
values $d_B$ and $d_p$ having the following relation $$d_B \leq (1/3)d_p,$$

where $d_p$ (mm) is a distance between said light beam spots adjacent each other in a main scanning direction on said light-sensitive medium and $d_B$ (mm) is a diameter of said light beam spot in the main scanning direction in forming an image when said image density output signal indicates a range in which said image is not developed.

19. An image forming apparatus comprising:
first image density signal conversion means for converting multi-valued image density input signal to an image density output signal with a first conversion property;
second image density signal conversion means having a second conversion property different from said first conversion property for converting a part of said image density input signal corresponding to a low density portion to an image density output signal indicating a range in which an image is not developed;

conversion/non-conversion discrimination means for determining whether conversion by said first and second image density signal conversion means is carried out on each group of adjacent image density input signals;

signal selection means for selecting one from the output after conversion of each group of said image density input signals by said first and second image density signal conversion means and the output without conversion of each group of said image density input signals by said first and second image density signal conversion means in accordance with a result of determination of said conversion/non-conversion discrimination means;

selection signal generation means for outputting a selection signal to select said first or second image density signal conversion means in a predetermined order, a phase of said selection signal being shifted in turn per every one or more main scanning synchronizing signals;

pattern signal generation means for generating a pattern signal;

phase control means for shifting the phase of said pattern signal generated by said pattern signal generation means per every one or more main scanning synchronizing signals to form a screen image having a predetermined screen angle;

pulse width modulation means for outputting a pulse width modulation signal generated by modulating pulse width of the signal output from said signal selection means utilizing said pattern signal; and image formation means for forming an image in accordance with said pulse width modulation signal output from said pulse width modulation means.

20. The image forming apparatus according to claim 19, further comprising:

operation means for performing a predetermined operation on plural image density input signals in each group of adjacent image density input signals to obtain an image density synthesizing signal and inputting said image density synthesizing signal to said first and second image density signal conversion means.

* * * * *